(12) United States Patent
Thomsen et al.

(10) Patent No.: US 7,941,273 B2
(45) Date of Patent: May 10, 2011

(54) SYSTEM AND METHOD FOR USING TIME-DISTANCE CHARACTERISTICS IN ACQUISITION, PROCESSING, AND IMAGING OF T-CSEM DATA

(75) Inventors: Leon Thomsen, Houston, TX (US); Norman C. Allegar, Houston, TX (US); Joseph A. Dellinger, Houston, TX (US); Petr Jilek, Houston, TX (US); Daniel Johnson, Houston, TX (US); Ganyuan Xia, Katy, TX (US)

(73) Assignee: BP Corporation North America, Houston, TX (US)

( * ) Notice: Subject to any disclaimer, the term of this patent is extended or adjusted under 35 U.S.C. 154(b) by 106 days.

(21) Appl. No.: 12/388,116

(22) Filed: Feb. 18, 2009

(65) Prior Publication Data

US 2009/0204330 A1 Aug. 13, 2009

Related U.S. Application Data

(62) Division of application No. 11/358,851, filed on Feb. 21, 2006, now Pat. No. 7,502,690.

(60) Provisional application No. 60/654,378, filed on Feb. 18, 2005.

(51) Int. Cl.
*G01V 3/00* (2006.01)
*G01V 1/00* (2006.01)

(52) U.S. Cl. .............................. 702/2; 367/38

(58) Field of Classification Search ................ 702/2, 14, 702/18; 367/21, 38, 39; 324/337, 339
See application file for complete search history.

(56) References Cited

U.S. PATENT DOCUMENTS

| | | | |
|---|---|---|---|
| 4,209,747 A | 6/1980 | Huchital | |
| 6,188,221 B1 | 2/2001 | Van de Kop et al. | |
| 6,339,333 B1 | 1/2002 | Kuo | |
| 6,739,165 B1 | 5/2004 | Strack | |
| 6,914,433 B2 | 7/2005 | Wright et al. | |
| 2002/0000808 A1 | 1/2002 | Nichols | |
| 2004/0220741 A1 | 11/2004 | Haugland | |
| 2004/0232917 A1* | 11/2004 | Wright et al. | 324/336 |
| 2005/0264295 A1* | 12/2005 | Strack et al. | 324/375 |
| 2008/0008035 A1 | 1/2008 | Smith et al. | |

OTHER PUBLICATIONS

Alumbaugh, et al., "Image Appraisal for 2D and 3D Electromagnetic Inversion", 1998, Publisher: 1998 SEG Expanded Abstracts, Published in: US.

(Continued)

*Primary Examiner* — Bryan Bui
(74) *Attorney, Agent, or Firm* — Albert K. Shung

(57) ABSTRACT

There is provided herein a system and method of acquiring, processing, and imaging transient Controlled Source Electro-Magnetic (t-CSEM) data in ways that are similar to those used for seismic data. In particular, the instant invention exploits the time-distance characteristics of t-CSEM data to permit the design and execution of t-CSEM surveys for optimal subsequent processing and imaging. The instant invention illustrates how to correct t-CSEM data traces for attenuation and dispersion, so that their characteristics are more like those of seismic data and can be processed using algorithms familiar to the seismic processor. The resulting t-CSEM images, particularly if combined with corresponding seismic images, may be used to infer the location of hydrocarbon reservoirs.

35 Claims, 5 Drawing Sheets

OTHER PUBLICATIONS

Bartel, L.C., "Effects of Surface Conductors on the TEM Late-Time Apparent Resistivity", 2001, Publisher: SEG Int'l Exposition and Annual Meeting, San Antonio, TX, Published in: US.

Cherkaeva, et al, "On Optimal Design of Transient Electromagnetic Waveforms", 1997, Published in: US.

El-Kaliouby, "Inversion of Coincident Loop TEM Data for Layered Polarizable Ground Using Neural Networks", 1999, Publisher: 1999 SEG Expanded Abstracts, Published in: US.

Everett, et al., "An Experimental Study of the Time-Domain Electromagnetic Response of a Buried Conductive Plate", 2005, pp. G1-17, vol. 70, No. 1, Publisher: Geophysics, Published in: US.

Fang, et al., "3-D Electromagnetic Inversion Using Quasi-Linear Approximation: Case Study", 1997, pp. 450-453, Publisher: SEG Technical Program Expanded Abstracts, Published in: US.

Haines, et al., "Development of Experimental Methods in Electroseismics", 2003, pp. 560-563, Publisher: SEG Technical Program Expanded Abstracts, Published in: US.

Helwig, et al., "The VIBRO OTEM Method", 1999, Publisher: SEG 1999 Expanded Abstracts, Published in: US.

Hordt, et al., "Effects of Topography in LOTEM Data Recorded At Vesuvius Volcano, Italy", 1999, Publisher: SEG 1999 Expanded Abstracts, Published in: US.

Hoversten, et al., "3D Numerical Simulation of a Deepwater EM Exploration Survey", 2005, Published in: US.

Hurs, et al., "3-D Electromagnetic Modeling Based on Quasi-Analytical Series", 1999, Publisher: SEG 1999 Expanded Abstracts, Published in: US.

Lee, et al., "Phase-Field Imaging: The Electromagnetic Equivalent of Seismic Migration", May 1987, pp. 678-693, vol. 52, No. 5, Publisher: Geophysics, Published in: US.

MacGregor, et al., "Use of Marine Controlled-Source Electromagnetic Sounding for Sub-Basalt Exploration", 2000, pp. 1091-1106, vol. 48, Publisher: European Association of Geoscientists & Engineers, Geophysical Prospecting, Published in: US.

Mehanee, et al., "3-D Finite Difference Forward Modeling Based on the Balance Method", Sep. 2001, Publisher: SEG Int'l Exposition and Annual Meeting, Published in: US.

Meng, et al., "2.5-D Electromagnetic Forward Modeling in the Time and Frequency Domains Using the Finite Element Method", 1999, Publisher: SEG 1999 Expanded Abstracts, Published in: US.

Mitsuhata, et al., "2-5-Dimensional Modeling and Inversion of CSEM Data", 1999, Publisher: SEG 1999 Expanded Abstracts, Published in: US.

Mogi, et al., "Array TDEM Survey in Dixie Valley, Nevada", 1999, Publisher: SEG 1999 Expanded Abstracts, Published in: US.

Nekut, et al., "Petroleum Exploration Using Controlled-Source Electromagnetic Methods", 1989, pp. 338-362, vol. 77, No. 2, Publisher: Proceedings of the IEEE, Published in: US.

Pavlov, et al, "Anomalous Conductivity and Magnetic Permeability Effects in Time Domain Electromagnetic Data", 1998, Publisher: 1998 SEG Explanded Abstracts, Published in: US.

Pavlov, et al, "Simultaneous in Version of TDEM Data for Anomalous Conductivity and Magnetic Permeability", 1999, Publisher: SEG 1999 Expanded Abstracts, Published in: US.

Pervago, et al., "Electric Field Modeling in Arbitrary Anisotropic Layered Media Using the Set of Fast Hankel Transformations of Integers", 2003, vol. 23, Publisher: SEG Expanded Abstracts, Published in: US.

Portniaguine, et al., "Focusing of Inversion Images", 1998, Publisher: 1998 SEG Expanded Abstracts, Published in: US.

Rosten, et al., "Generalized Electromagnetic Seabed Logging Wavefield Decomposition Into U/D-Going Components", 2004, pp. 592-595, Publisher: SEG Technical Program Expanded Abstracts, Published in: US.

Shaw, et al., "The Electro-Kinetic Effect: Forward Model and Measurements", 2002, Publisher: SEG Int'l Exposition and 72ND Annual Meeting, Published in: US.

Shi, et al., "Application of Electrical Resistivity Tomography to Image Harrrison Caves in Barbados, West Indies", 1997, pp. 350-353, Publisher: Society of Exploration Geophysicists, Published in: US.

Spies, "Depth of Investigation in Electromagnetic Sounding Methods", Jul. 1989, pp. 872-888, vol. 54, No. 7, Published in: US.

Tartaras, et al., "Finite-Difference EM Modeling and Imaging in a Medioum With a Vertical Axis of Symmetry", 1999, Publisher: SEG 1999 Expanded Abstracts, Published in: US.

Tartaras, et al., "Fast Imaging of Nojima Fault Zone TDEM Data Using S-Inversion", 1997, pp. 346-349, Publisher: Society of Exploration Geophysicists, Published in: US.

Tartaras, et al., "Fast S-Inversion in the Time Domain: Method of Interpretation Using the Thin Sheet Approach", 1996, pp. 1306-1309, Publisher: Society of Exploration Geophysicists, Published in: US.

Tseng, et al., "A Borehole-To-Surface Electromagentic Survey", Feb. 18, 1998, pp. 1565-1572, Publisher: Society of Exploration Geophysicists, Published in: US.

Van Der Kruk, et al., "General Framework for Describing Electrical and Electromagnetic Exploration Methods", 1997, pp. 374-377, Publisher: SEG Technical Program Expanded Abstracts, Published in: US.

Walker, "Rapid Joint Imaging of Multiple Electromagnetic Data Sets", 1998, Publisher: 1998 SEG Expanded Abstracts, Published in: US.

Weiss, "A Matrix-Free Approach to Solving the Fully 3D Electromagnetic Induction Problem", Sep. 2001, Publisher: SEG Int'l Exposition and Annual Meeting, Published in: US.

Wright, et al., "Hydrocarbon Detection With a Multi-Channel Transient Electromagnetic Survey", Sep. 2001, Publisher: SEG Int'l Exposition and Annual Meeting, Published in: US.

Wright, et al., "Hydrocarbon Detection and Monitoring With a Multicomponenttransient Electromagnetic (MTEM) Survey", 2002, pp. 852-864, Publisher: The Leading Edge, Published in: US.

Xie, et al., "3D Boundary-Domain Finite Element Method for Electromagnetic Modeling", 1998, Publisher: 1998 SEG Explanded Abstracts, Published in: US.

Yoshioka, et al., "Sea Bed Loggin G With Three Component Electrical Receivers", 2004, Publisher: 74th Annual International Mtg., Soc. Expl. Geophys., Published in: US.

Zhang, et al., "An New Electromagnetic Imaging Scheme", 1997, pp. 403-405, Publisher: SEG Technical Program Expanded Abstracts, Published in: US.

Zhdanov, et al., "Underground Imaging by Frequency-Domain Electromagnetic Migration", May 1996, pp. 666-682, vol. 3, No. 61, Publisher: Geophysics, Published in: US.

Zhdanov, et al., "Finite Functions in the Solution of 3-D Electromagnetic Inverse Problems", 1998, Publisher: 1998 SEG Expanded Abstracts, Published in: US.

Zhdanov, et al., "Preconditioned Time Domain Electromagentic Migration", 1998, Publisher: 1998 SEG Expanded Abstracts, Published in: US.

Zadanov, et al., "Fast Imaging of TDEM Data by 2-5-D Finite Difference Electromagnetic Migration", Sep. 2001, Publisher: SEG Int'l Exposition and Annual Meeting, Published in: US.

Zhdanov, et al., "2-D Finite Difference Time Domain Electromagnetic Migration", 1997, pp. 370-373, Publisher: 67th Annual Internat. Mtg. Soc. Expl. Geophys. Expanded Abstracts, Published in: US.

Zhdanov, et al., "Quasi-Linear Series in Three-Dimensional Electromagnetic Modeling", 1997, pp. 462-465, Publisher: 1997 SEG Expanded Abstracts, Published in: US.

Zhdanov, et al., "Accuracy Estimation and Model Study of the Quasi-Linear Series Method of 3-D Electromagnetic Modeling", 1998, Publisher: 1998 SEG Expanded Abstracts, Published in: US.

\* cited by examiner

SYSTEM AND METHOD FOR USING TIME-DISTANCE CHARACTERISTICS IN ACQUISITION, PROCESSING, AND IMAGING OF T-CSEM DATA

RELATED APPLICATION

This application is a divisional of U.S. Utility patent application Ser. No. 11/358,851, filed Feb. 21, 2006 now U.S. Pat. No. 7,502,690, which claims the benefit of U.S. Provisional Patent Application Ser. No. 60/654,378 filed on Feb. 18, 2005, the disclosures of which are incorporated by reference as if fully set out at this point.

TECHNICAL FIELD

This invention relates to the general subject of geophysical exploration for hydrocarbons and, in particular, to methods for collecting and analyzing time-domain controlled source electromagnetic earth survey data.

BACKGROUND OF THE INVENTION

Electro-Magnetic Exploration Methods

Measurements of resistivities of subsurface Earth formations have long been used, among other purposes, for differentiating rock layers that contain hydrocarbons from other, non-oil bearing rock layers. For example, records of resistivity with respect to depth in a wellbore (called "resistivity well logs") have been routinely used for many years to identify hydrocarbon producing intervals within a well bore drilled through Earth formations. However, more recently, surface-based surveys of subsurface resistivity have been utilized that do not require that a well be drilled. See, for example, U.S. Pat. Nos. 4,286,218, 4,617,518, 4,663,593, 4,757,262, 4,792,761, 4,862,089, 5,043,667, 5,467,018, 5,563,513, 5,770,945, 6,191,587, 6,603,313, 6,628,119 B1, 6,696,839 B2, 6,717,411 B2, 6,842,006 B2, 6,900,639, 6,914,433; U.S. Patent Application Publications Nos. 2003/0050759 A1, 2004/0239297 A1, 2005/0017722 A1, 2605/0077902 A1). Such techniques instead include making measurements from the Earth's surface that are subsequently used to infer the subsurface resistivity distribution, (Strack, K.-M., 1992, *Exploration with deep transient electromagnetics*, Elsevier, 373), or making such measurements at the surface of or on the bottom of a body of water. It is the latter son of survey that is of most interest for purposes of the instant disclosure.

Although surface-based resistivity surveys come in a number of different forms, there are two main variants: natural-source (magnetotelluric, "MT") surveys, and controlled-source ("CSEM") surveys, wherein by "controlled-source" is meant any artificial source. As discussed below, it is the latter sort of survey that is of most interest for purposes of the instant disclosure.

Note that some surface-based EM surveys operate at very high frequency, in which case the source waves propagate in the earth according to both the dielectric constant of the earth material and the subsurface resistivity, Such survey techniques are called "ground penetrating radar" and typically investigate only to depths of a few meters (cf., Everett, 2005, M. E., Benavides, A., and Pierce, C. J., 2005, *An experimental study of the time-domain electromagnetic response of a buried conductive plate*, Geophysics 70(1)). In order to investigate deeper into the earth (i.e., in the hydrocarbon context discussed herein), it is necessary to use lower frequencies (<10 Hertz), in which case the waves propagate according to the resistivity only. The term CSEM as used herein shall refer only to such low-frequency surveys.

CSEM surveys generally utilize as a signal source a surface-generated electrical current that is introduced into the Earth's subsurface through one or more electrodes, or "lines of contact." (Some sources are instead current loops that inject electromagnetic energy into the Earth, not by conduction, but by induction; we concentrate here on the former.) The one or more electrodes might either be placed in direct contact with the surface of the Earth (e.g., in a land survey) or towed behind a boat through the water above the ocean floor (e.g., in a marine survey), or placed in contact with the ocean floor. Receivers are positioned on the Earth's surface (or on the ocean bottom) and are arranged to measure the electric and/or magnetic fields that are introduced into the Earth's subsurface by the source. These measurements are used to estimate the distribution of effective or apparent resistivity of the Earth's subsurface beneath the receivers according to methods well known to those of ordinary skill in the art. These resistivities are then interpreted, by those skilled in the art, in terms of hydrocarbon occurrence. Note that depending on the signal source and survey design, the receivers might be situated at distances from zero to 20 kilometers away from the source.

Generally speaking, the Earth's subsurface has relatively few large-contrast resistivity boundaries between adjacent rock formations. However, rock formations that contain hydrocarbons tend to show a large resistivity contrast (in comparison with the formations that enclose them) and, as a consequence, surface-based resistivity survey methods have long been viewed as potential direct hydrocarbon indicators. For example, the resistivity of a hydrocarbon bearing formation could be on the order of a few tens of Ohm-meters (Ohm-rnm) or higher, as compared with the resistivity of over- and under-lying water-saturated sediments, which have resistivity on the order of 2 Ohm-m or less. Thus, when hydrocarbons are present in the Earth's subsurface, surface-based resistivity survey methods potentially can be used to detect them when other geophysical methods might not. As a consequence, there is currently a great deal of interest in using surface-based resistivity survey methods to locate new sources of trapped hydrocarbons, to monitor the hydrocarbon distribution within an existing reservoir (e.g., reservoir monitoring over time), etc.

Although there are a number of resistivity survey variants, of particular interest for purposes of the instant disclosure are surveys that utilize an artificial source, or controlled source, (i.e., controlled source electro-magnetic measurements, or "CSEM", hereinafter). See, for example, U.S. Pat. Nos. 4,617,518, 4,663,593, 5,467,018, 5,563,513, 5,883,515, 6,541,975, 6,603,313, 6,628,110, 6,628,119 B1, 6,696,839 B2, 6,717,411 B2, 6,842,006 B2, 6,891,376, 6,900,639, 6,914,433; and U.S. Patent Application Publications Nos: 2003/0050759 A1, 2004/0239297 A1, 2004/232917, 2005/0017722 A1, 2005/0077902 A1; WIPO Application Publications Nos: WO 01/57555 A1, WO 03/023452, WO 03/048812). This technology most frequently is operated in a marine environment, with a boat pulling a substantially horizontally disposed electric dipole electrode or antenna array near the sea bottom, above a set of sea-bottom receivers. The receivers can be autonomous nodes, or arrays cabled in some fashion. The antenna or electrode array is coupled to a suitable electric power generator that is situated on the boat (collectively "the source").

As the source is towed in the vicinity of the set of receivers, electromagnetic energy propagates from source to receiver, via a variety of paths (e.g., through the water, though the earth, along the water/earth interface, etc), and the variations in the amplitude and phase of these fields are detected and recorded by each of the receivers. The receivers are subsequently recovered from the sea floor, and the data are collected. Various processing algorithms are then used to determine the spatial resistivity distribution of the Earth's subsurface beneath the position of the receivers.

The source is usually programmed to create a low-frequency electromagnetic signal by varying the voltage that is supplied to the electric dipole. In some variations, alternating currents are employed as the signal source, with the polarity of such current being reversed at a selected frequency. Any such surveying, with a continuously energized source operating at one or a few selected frequencies is hereinafter called frequency-domain controlled-source electromagnetic surveying ("f-CSEM"). f-CSEM techniques are described, for example, in Sinha, M. C. Patel, P. D., Unsworth, M. J., Owen, T. R. E., and MacCormack, M. G. R., 1990, *An active source electromagnetic sounding system for marine use*, Marine Geophysical Research 12, 29-68, the disclosure of which is incorporated by reference herein as if fully set out at this point.

In the marine context, the more widely used CSEM acquisition methods use frequency-domain techniques and, more particularly, use a continuous source that operates at one or a few discrete frequencies. Srnka, U.S. Pat. No. 6,603,313, the disclosure of which is incorporated herein by reference, discusses a good example of such f-CSEM survey techniques, citing therein several other recent patents and publications sharing this same class of techniques.

Another controlled-source technique for surface-based resistivity surveying is known as transient (or time-domain) controlled-source electromagnetic surveying, called "t-CSEM" hereinafter. In t-CSEM, an electrode array or antenna array is used to induce an electromagnetic field in the Earth's subsurface in the same general manner as was discussed previously in connection with f-CSEM, except the source current is operated in fixed-duration impulses (separated by enough time to allow for signal propagation within the Earth prior to a repeated impulse), rather than continuously as for f-CSEM. See, for example Edwards, R. N., 1997, *On the resource evaluation of marine gas hydrate deposits using the sea-floor transient electric dipole-dipole method*, Geophysics, 62, 63-74; Yu, L., and Edwards, R. N., 1996, Imaging axi-symmetric TAG-like structures by transient electric dipole seafloor electromagnetics, Geophys. Res. Lett., invited paper, 23, 3459-3462; Nobes, D. C., Law, L. K., and Edwards, R. N., 1992, *Results of a seafloor electromagnetic survey over a sedimented hydrothermal area on the Juan de Fuca Ridge*. Geophysical Journal International, 110, 333-347; Chave, A. D., Constable, S. C. and Edwards, R. N., 1991, *Electrical exploration methods for the seafloor*, Investigation in geophysics No 3, Electromagnetic methods in applied geophysics, vol. 2, application, part B, 931-966; Cheesman, S. J., Law, L. K., and Edwards, R. N. 1991; *Porosity determinations of sediments in Knight Inlet using a transient electromagnetic system*, Geomarine Leters 11, 84-89; Cheesman, S. J. Edwards, R. N., and Law, L. K., 1990, *A short baseline transient electromagnetic method for use on the sea floor*, Geophysical Journal 103, 431-437, and others.

In t-CSEM techniques, the electrodes or antennas may be charged using a direct current ("DC") source that after some selected time is shut off, causing an abrupt termination of the electric current. This transient EM event propagates into the subsurface, and eventually to the receivers. Data are collected from the receivers during the time interval after the source current is switched off. Predictably, such data reflect a general decay in the measured voltages, as time progresses subsequent to the source termination. Note that this is in contrast to f-CSEM methods which collect data from the receivers while the source current is flowing. The time variation of the voltages that are measured after the termination of the source current is used to infer the resistivity distribution of the Earth's subsurface. T-CSEM techniques are described, for example, in Strack, K.-M., 1992, cited previously, the disclosures of which are incorporated herein by reference as if fully set out at this point. For the most part, t-CSEM techniques have typically been used in connection with land surveys (see, for example, Everett, 2005, cited previously, for an application in the context of exploration for unexploded ordinance, or Strack, K.-M., Vozoff, K., 1996, *Integrating long-offset transient electromagnetics (LOTEM) with seismics in an exploration environment*, Geophysical Prospecting 44, 99-101, for a summary of hydrocarbon applications).

Note that although f-CSEM methods are more widely used in hydrocarbon exploration (than are t-CSEM techniques), they have significant drawbacks. For example, marine f-CSEM is best applied when the water is relatively deep as compared to the depth of the subsurface formations being evaluated, more specifically when the ratio of the depth of the water to the (sub-seafloor) depth of the target formations (or reservoir) is greater than about 1.5. By contrast, the t-CSEM methods taught in the foregoing disclosures have no such limitations.

Since the signal that is detected by the receivers in CSEM techniques after traveling through the Earth's subsurface is very low in amplitude, it may be detected more readily if the source itself is no longer active. This, of course, constitutes an advantage for t-CSEM surveys, wherein the source is deactivated while data is collected from the receivers. Thus, if the source signature is continuous (or of long duration) rather than transient (or of short duration), the source signal may mask the voltage variations that might be caused by differences in the subsurface lithology. Wright (Intl Pat. Appl. WO 03/023452) and Rueter et al. (U.S. Pat. No. 5,467,018), which disclosure is incorporated herein by reference, contains a good discussion of t-CSEM methods, particularly in the land context.

The Seismic Method

Although the instant invention is directed principally toward the acquisition, analysis, and processing of controlled source electromagnetic data, a brief overview of some salient aspects of the geophysical reflection seismic method will prove instructive to the discussion that follows. A reflection seismic survey represents an attempt to image or map the subsurface of the Earth by sending sound energy down into the ground and recording the echoes that return from the rock layers below. The source of the down-going sound energy might come, for example, from explosions or seismic vibrators on land, or air guns in marine environments. During a seismic survey, the energy source is placed at various locations near the surface of the Earth above a geologic structure of interest. Each time the source is activated, it generates a seismic signal that travels downward through the Earth, is reflected, and, upon its return, is recorded at a great many receivers disposed on or near the Earth's surface. Signals from multiple source/recording geometry combinations are then combined to create a densely sampled profile of the subsurface that can extend over a substantial subsurface area. In a two-dimensional (2-D) seismic survey, the recording locations are generally disposed along a single line, whereas in a three dimensional (3-D) survey, the recording locations are distributed across the surface in a grid pattern. In simplest terms, a 2-D seismic line can be thought of as giving a cross-sectional picture (vertical slice) of the Earth layers as they exist directly beneath a line drawn through the recording locations. A 3-D survey produces a data volume that is a 3-D representation of the subsurface that lies beneath the survey area. In reality, though, both 2-D and 3-D surveys interrogate some volume of earth lying beneath the area covered by the survey.

A seismic survey is composed of a large number of individual seismic recordings or traces. In a typical 2-D survey, there will usually be several tens of thousands of traces, whereas in a 3-D survey the number of individual traces may run into the multiple millions of traces. Chapter 1, pages 9-89, of Yilmaz, 1987, contains general information relating to conventional 2-D processing and that disclosure is incorporated herein by reference. General background information pertaining to 3-D data acquisition and processing may be found in Chapter 6, pages 384-427, of Yilmaz, the disclosure of which is also incorporated herein by reference.

A seismic trace is a digital recording of the acoustic energy reflecting from inhomogeneities or discontinuities in the subsurface. A partial reflection typically occurs wherever there is a change in the elastic properties of the subsurface materials. The digital samples in a trace are usually acquired at 0.002 second (2 millisecond or "ms") intervals, although 4 ms and 1 ms sampling intervals are also common. Each discrete sample in a conventional digital seismic trace is associated with a particular time with respect to the actuation time of the seismic energy source. In the case of reflected energy, a two-way travel time from the source to the reflector and back to the surface again, assuming (of course) that the source and receiver are both located on the surface, is associated with particular amplitude events in the traces. Many variations of the foregoing source-receiver arrangement are used in practice, e.g. VSP (vertical seismic profile) surveys, ocean-bottom surveys, etc. Furthermore, the surface location of the source and receiver associated with every trace in a seismic survey is carefully recorded and is generally made a part of the trace itself (as part of the trace header information). This allows the seismic information contained within the traces to be later correlated with specific surface and subsurface locations, thereby providing a means for posting and analyzing seismic data—and attributes extracted therefrom—on a map (i.e., "mapping").

Over many decades, the art of seismic survey design has advanced considerably, and modern practitioners use the time-distance characteristics expected of the data to optimally design the survey, for the purposes of subsequent analysis. By the phrase time-distance characteristics, is meant those characteristics of EM data that vary with the amount of natural time since the initiation of the source (time of propagation from source to receiver), and with the relative positions of the sources and receivers (vector or scalar distance between source and receiver). Examples of seismic design consideration that involve the time-distance relationship include, without limitation, such issues as receiver positioning, source positioning, array filtering, the attitude of structural elements within the subsurface, the frequencies in the data, etc. Note that, for purposes of the instant disclosure, when the term "distance" is used herein that term should be broadly construed to include vector distances, scalar distances, or both depending on the context.

Similarly, over many decades the art of seismic processing has advanced considerably, and modern practitioners once again use the time-distance characteristics of the data to optimally process such data. Examples of seismic processes that exploit samples of a trace according to an offset and a time (the time-distance relationship) include, without limitation, velocity filtering, frequency-wavenumber ("f-k") filtering, intercept-slowness ("tau-p") filtering, initial trace mute (i.e., zeroing each trace for all samples earlier than the first signal arrival), amplitude variation with offset (i.e., "AVO"), velocity determination, tomography, etc.

Further, over many decades, the art of seismic imaging has advanced considerably, and modern practitioners use the time-distance characteristics of the data to optimally image it. "Imaging" is the process of constructing band-limited ("fuzzy") images directly from the data (either in 2-D or 3-D, according to the survey design). (Imaging may be contrasted with "inversion", which is the process of using the data to evaluate the parameters of a pre-conceived model.) Additional examples of seismic processes that exploit the time-distance relationship include, without limitation, Normal MoveOut ("NMO") removal, Dip MoveOut ("DMO") removal, migration (time or depth), tomography, velocity estimation, etc.

For example, the simplest form of imaging is called common-midpoint stacking, wherein the reflected arrivals (acquired with fit-for-purpose acquisition design, and perhaps cleansed of noise) are sorted into Common Mid Point ("CMP") gathers, that is, a group of traces with acquisition geometry in which the mid-points (between the source positions and the receiver positions) are the same, corrected for differences in arrival time (the "moveout") of reflective events for various offsets (distance between the source and receiver for each acquired trace), and then summed together ("stacked"). A more sophisticated type of processing is common-image-point stacking, wherein information about the subsurface wave-propagation paths is incorporated to tailor the sorting and moveout-correction to specific subsurface reflector(s) of interest.

The time-distance corrections that are applied to seismic data typically involve determination of a velocity function, which function is usually empirically determined from the data, and that is variable in 1, 2, or 3 spatial dimensions (or in both space and time). Although seismic velocities may be determined in many different ways, two commonly used techniques are coherency analysis and tomographic analysis.

Seismic data that have been properly acquired and processed can provide a wealth of information to the explorationist, one of the individuals within an oil exploration company whose job it is to locate potential drilling sites. For example, a seismic survey can provide the explorationist a broad view of the subsurface structure of the rock layers and can often reveal important features associated with the entrapment and storage of hydrocarbons such as faults, folds, anticlines, unconformities, and sub-surface salt domes and reefs, among many others. During the computer processing of seismic data, estimates of subsurface rock acoustic velocities are routinely generated, and near-surface inhomogeneities in the rock properties are detected and displayed. In some cases, seismic data can be used to directly estimate rock porosity (fractional volume of pore space in the rock), water saturation (fractional volume of the pore space that is water-filled), and hydrocarbon content (fractional volume of the pore space that is hydrocarbon-filled). In other techniques, seismic trace waveform attributes such as phase, peak amplitude, peak-to-trough ratio, Amplitude versus Offset, and a host of others, can often be empirically correlated with known hydrocarbon occurrences, and that correlation can be applied to seismic data collected over new exploration targets.

Although all of these seismic techniques are well developed, understood, and often very effective, there remain many geologic contexts where they are less effective, for a multitude of reasons. Heretofore, as is well known in the geophysical prospecting and interpretation arts, there has been a need for a method of using non-seismic techniques to obtain a resistivity image of the subsurface that does not suffer from the limitations of the prior seismic art. Accordingly, it should now be recognized, as was recognized by the present inventors, that there exists, and has existed for some time, a very real need for a method of geophysical prospecting using t-CSEM that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

According to a preferred aspect of the instant invention, there is provided a system and method of acquiring, processing, and imaging t-CSEM data, in the hydrocarbon context(s) of exploration, appraisal, development, and surveillance, in ways that are similar to those used for seismic data. In particular, the instant invention exploits the time-distance characteristics of t-CSEM data to permit the design and execution of t-CSEM surveys for optimal subsequent processing. In more particular, one aspect of the instant invention exploits the time-distance characteristics of t-CSEM data traces to permit the use of most seismic processing algorithms on t-CSEM data traces, in ways that are similar to those used for seismic data. In further particular, the instant invention exploits the time-distance characteristics of t-CSEM data to permit, for the first time, the application of various imaging algorithms to properly acquired and processed t-CSEM data. The instant inventors have discovered that the transient nature of the t-CSEM source creates data records that are similar in many respects to those acquired during a reflection seismic survey. In fact, after appropriate processing via the methods disclosed herein, the t-CSEM data traces may be treated very similarly to seismic traces for purposes of data enhancement, imaging, and interpretation.

EM wave propagation in this context differs from seismic wave propagation in that the propagation is strongly attenuative, and highly dispersive (i.e. the velocity is highly frequency dependent). Such propagation can be described as "diffusive". These characteristics impede, and sometimes preclude, the successful application of the ideas introduced above. Hence in another preferred aspect of the instant invention, there is provided a method for correcting t-CSEM data for the effects of attenuation and dispersion, in order to exploit more effectively the ideas introduced above. As a consequence, the data may readily be processed and imaged via standard reflection-seismic algorithms. Although the resulting images will have less resolution than do seismic images, they will indicate resistivity distributions in the subsurface, and hence (after geologic interpretation), they can provide a more direct indication of the presence of hydrocarbons. In conjunction with conventional seismic images of the same subsurface volume, the benefits of both techniques may be realized.

According to a further preferred embodiment, there is provided hereinafter a method of correcting the attenuation and dispersion of t-CSEM data that makes such amenable for processing with reflection-seismic-style algorithms thereafter. In more particular, in the preferred embodiment the instant method corrects attenuation at each frequency according to its square root, and corrects for dispersion using $Q=\frac{1}{2}$.

Finally, for purposes of the instant invention it should be noted that the term "time-distance" processes will be broadly construed to include those processes that potentially treat each sample in a trace differently, depending on the natural time of occurrence of that sample within the trace (and of course, the source-receiver distance, etc.). By "natural" time, we mean that measure of time which is normally understood, by lay persons and scientists alike, and which appears in all the governing equations of (non-relativistic) physics. Note that it is important that, as compared with the prior art, that the algorithm operate in natural time (e.g., the recorded time axis will not been transformed to log-time). If, as in some of the prior art (e.g., Ziolkowski and Hobbs, 1998, *CMP method applied to multichannel transient electromagnetic data, 60$^{th}$ EAEG conference, Leipzig, Germany, Extended, Abstracts, Paper* 10-05), the data were transformed to logarithmic time, then, in general, seismic processing could not be applied, since this is a non-linear transformation (i.e., if the starting-point of time were changed, the results would be different). Non-linear operations on EM data should generally be avoided, as the transformed data no longer obeys the underlying physics equations.

The foregoing has outlined in broad terms the more important features of the invention disclosed herein so that the detailed description that follows may be more clearly understood, and so that the contribution of the instant inventors to the art may be better appreciated. The instant invention is not to be limited, in its application, to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which.

DETAILED DESCRIPTION

Figure 1:
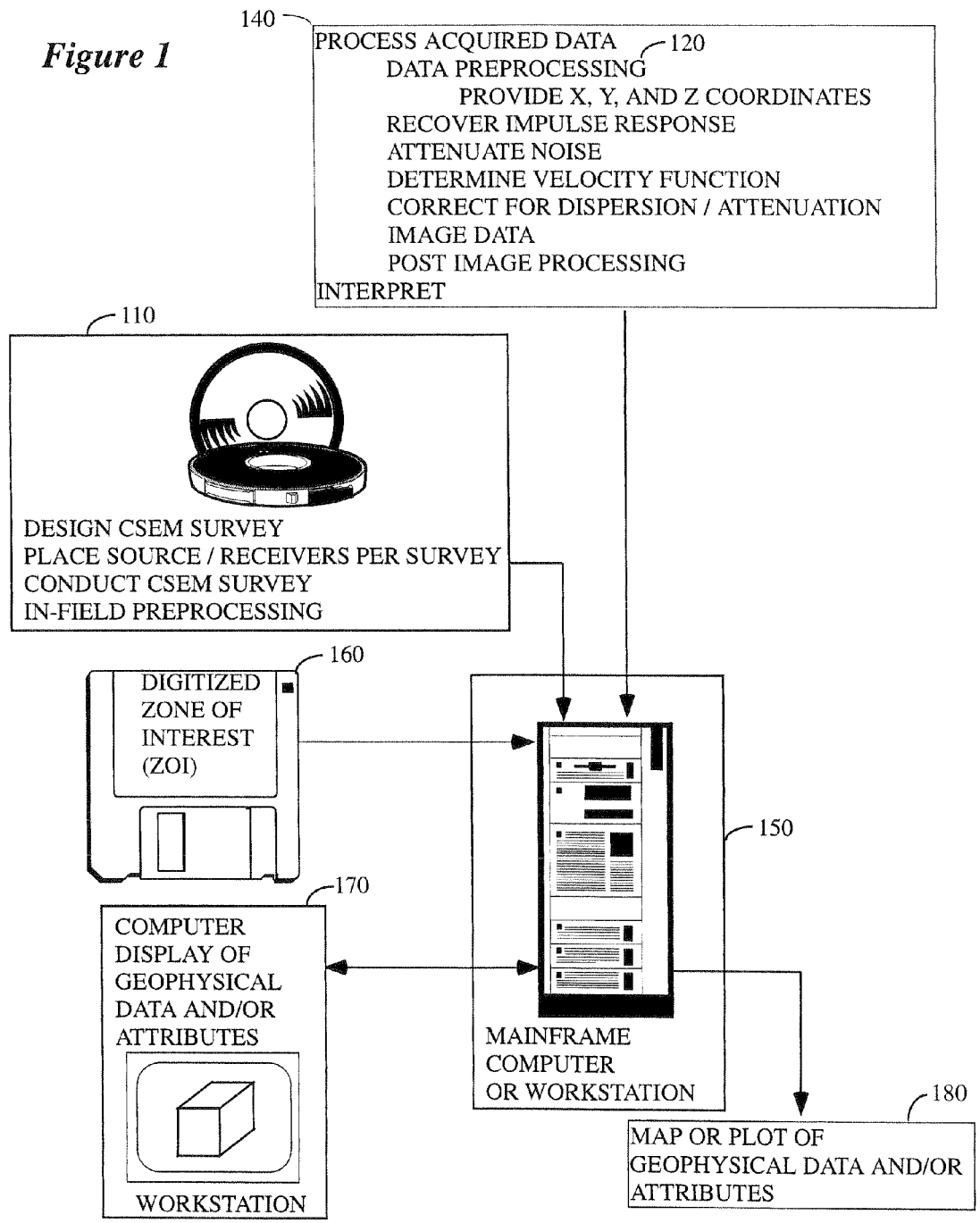
FIG. 1 illustrates the general environment of the instant invention.

While this invention is susceptible of being embodied in many different forms, there is shown in the drawings, and will be herein described hereinafter in detail, some specific embodiments of the instant invention. It should be understood, however, that the present disclosure is to be considered an exemplification of the principles of the invention and is not intended to limit the invention to the specific embodiments or algorithms so described.

General Environment of the Invention

FIG. 1 illustrates a general environment in which the instant invention would typically be used. Following survey-design principles described below, t-CSEM data are collected in the field 110 (while the preferred embodiment is in the marine context, it is not restricted to such and can include land, and borehole, and combined applications) over or alongside a subsurface target of potential economic importance for the exploration and exploitation of hydrocarbon resources, and are typically sent thereafter to a data processing center. Either in the field 110 or in the data processing center a variety of preparatory processes 120 might be applied to the data traces to make them ready for use by the methods disclosed hereinafter. In most cases, each recorded data trace will be associated with at least an X and a Y coordinate on the surface of the earth (or relative to some other coordinate system) that marks the location of the physical receiver that was used to record that trace. Further, it is also typical to pair each recorded trace with a Z value that represents its elevation relative to some arbitrary datum. The processed traces would then be made available for use with the instant invention and might be stored, by way of example only, on hard disk, magnetic tape, magneto-optical disk, DVD disk, or any other mass storage means known in the art.

The methods disclosed herein would best be implemented in the form of computer programs 140 that have been loaded onto a general-purpose programmable computer 150 where they are accessible by a seismic interpreter or processor. Note that a general-purpose programmable computer 150 would typically include, in addition to mainframes and workstations, computers that provide for parallel and massively parallel computations, wherein the computational load is distributed between two or more processors. As is also indicated in FIG. 1, in some preferred embodiments a digitized zone of interest model 160 would be specified by the user and provided as input to the processing computer program 140. In the case of a 3-D survey, the zone of interest model 160 would typically include specifics as to the lateral extent and thickness (which might be variable and could be measured in time or depth) of a subsurface volume of interest. The exact means by which such zones are created, picked, digitized, stored, and later read during program execution is not critical to the instant invention and those skilled in the art will recognize that this might be done any number of ways.

A program or programs 140 embodying the instant invention might be conveyed into the computer by means of, for example, a floppy disk, a magnetic disk, a magnetic tape, a magneto-optical disk, an optical disk, a CD-ROM, a DVD disk, a RAM card, flash RAM, a RAM card, a PROM chip, or loaded over a network. Accordingly, the manner of storing and loading the program 140 into the computer 150 is not a limitation on the scope of this invention.

After t-CSEM data have been subjected to the processes discussed herein, the resulting information would typically displayed either at a high-resolution color computer monitor 170 or in hard-copy form as a printed section or a map 180. The geophysical interpreter would then use the displayed images to assist in identifying subsurface features conducive to the generation, migration, or accumulation of hydrocarbons.

Figure 2:
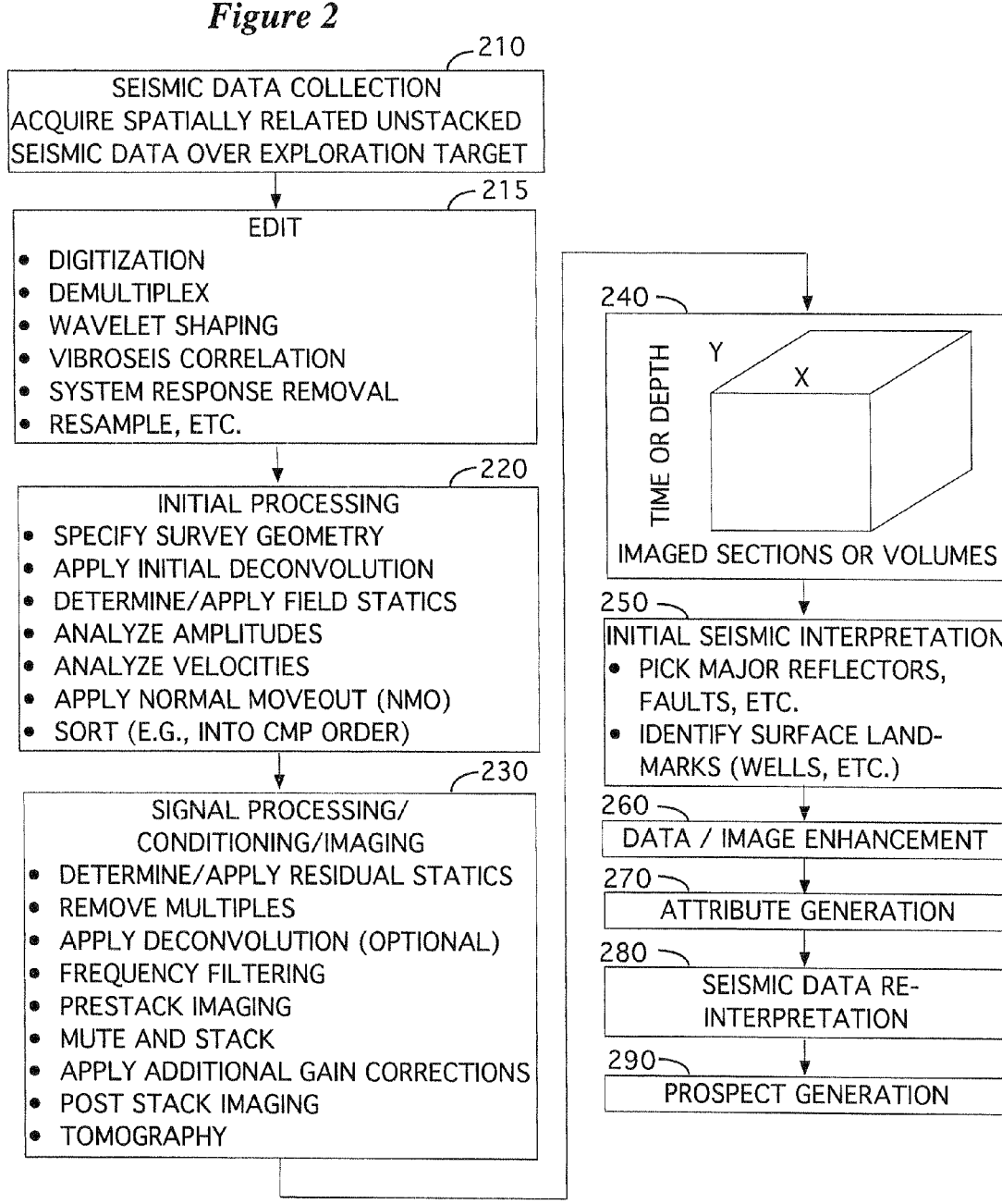
FIG. 2 illustrates a seismic processing sequence suitable for use with the instant invention.

Turning now specifically to the processing and interpretation of geophysical seismic data, in a typical seismic processing environment the seismic data would be subjected to a variety of processes before they are given to the interpreter. FIG. 2 illustrates in a general way the sorts of processes that might be applied to conventionally acquired seismic data. Further, and as is discussed in greater detail below, one key aspect of the instant invention is that after suitable correction for dispersion/attenuation, t-CSEM data can be treated for all practical purposes as if they were seismic data, provided that they have been properly acquired and processed. Hence, the processes of FIG. 2, as discussed below, may be applied in substantial degree to t-CSEM data.

Those of ordinary skill in the art will recognize that the processing steps illustrated in FIG. 2 are only broadly representative of the sorts of processes that might be applied to EM or seismic data and the choice and order of the processing steps, and the particular algorithms that have been selected may vary markedly depending on the individual seismic processor, the signal source (dynamite, vibrator, etc.), the survey location (land, sea, etc.) of the data, the preferences of the company that processes the data, etc.

As a first step, and as is generally illustrated in FIG. 2, in the seismic arts a 2-D or 3-D seismic survey is conducted over a particular volume of the earth's subsurface (shown at 210) that contains one or more geologic features of interest, the goal being to obtain information related to the target feature. The seismic data collected in the field consist of unstacked (i.e., unsummed) seismic traces which contain digital signals representative of the volume of the earth lying beneath the survey equipment. Methods by which such data are obtained and processed into a form suitable for use by seismic processors and interpreters are well known to those of ordinary skill in the art.

After seismic data are acquired, they are typically taken to a data processing center where some initial or preparatory processing procedures are applied to them. As is illustrated in FIG. 2, a common early procedure, shown at 215, is designed to edit the input seismic data in preparation for subsequent processing (e.g., digitization, demultiplexing, wavelet shaping, bad trace removal, etc.). This might be followed by specification of the geometry of the survey (shown at 220) and storing of a shot/receiver number and corresponding surface locations as part of each seismic trace header. Once the geometry has been specified, it is customary to perform a velocity analysis and apply NMO (Normal MoveOut) adjustment to correct each trace in time to account for signal arrival-time delays caused by variations in offset.

After the initial pre-stack processing is completed, it is common to condition the seismic signal that is located within the unstacked seismic traces (step 230). In FIG. 2 at 230 a typical "Signal Processing/Conditioning/Imaging" processing sequence is performed, but those skilled in the art will recognize that many alternative processes could be used in place of the ones listed in FIG. 2. In any case, the ultimate goal, from the standpoint of the explorationist, is the production of a stacked seismic volume or, in the case of 2-D data, a stacked seismic line for use in the exploration for hydrocarbons within the subsurface of the earth.

As is suggested in FIG. 2, any digital sample within a stacked seismic volume is uniquely identified by a coordinate triplet (X, Y, TIME), with the X and Y coordinates representing the geodetic position of the receiver on the surface of the Earth (or the sea floor), and the time coordinate representing a recorded natural arrival time within the seismic trace (shown at 240), and a corresponding coordinate doublet (x, y) representing the position of the source. For purposes of specificity, when speaking of 3-D data volumes it will be assumed that the X direction corresponds to the "in-line" direction, and the Y measurement corresponds to the "cross-line" direction, as the terms "in-line" and "cross-line" are generally understood in the seismic art. Although natural time is a preferred and most common vertical axis unit, those skilled in the art understand that, as a result of the final imaging step, other units are certainly possible, including, for example, depth.

The explorationist may perform an initial interpretation 250 of the resulting stacked volume, wherein the principal reflectors and faults are located and identified within the data set. This might be followed by additional data enhancement 260 and/or attribute generation (shown at 270) of the stacked or unstacked seismic data. In many cases, the explorationist will revisit the original interpretation in light of the additional information obtained from the data enhancement and attribute generation procedures (shown at 280). As a final procedure, the explorationist will typically use information gleaned from the seismic data together with other sorts of data (magnetic surveys, EM surveys, gravity surveys, LANDSAT data, regional geological studies, well logs, well cores, etc.) to locate subsurface structural or stratigraphic features conducive to the generation, migration, or accumulation of hydrocarbons (i.e., prospect generation 290).

Preferred Embodiments

The instant invention is broadly founded on the observation that the transient nature of t-CSEM data creates data traces that are in some sense analogous to those created by the impulsive sources of the reflection seismic method. This can include a separate or joint acquisition and treatment of seismic and t-CSEM data. It has further been discovered that, especially if t-CSEM data are properly conditioned, they take on the time-distance characteristics of seismic data, and can thereafter be processed using most algorithms that would be suitable for use with stacked or unstacked seismic data. Further, and after such proper conditioning, the resulting t-CSEM traces may be treated similar to reflection seismic traces for purposes of data enhancement, subsurface imaging, and geophysical interpretation.

Figure 7:
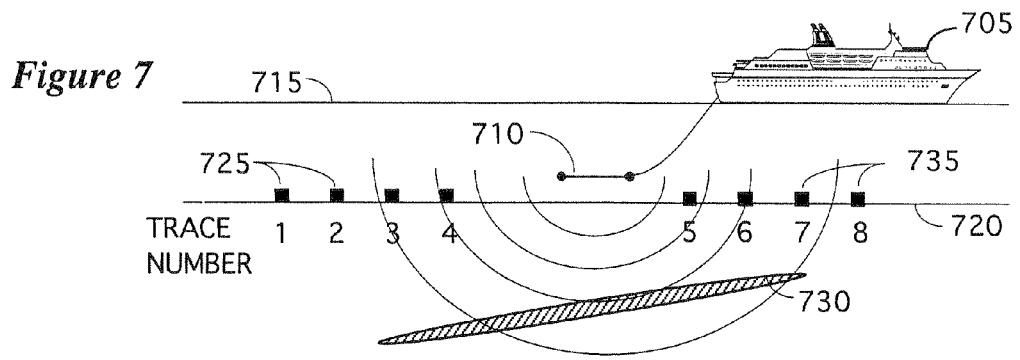
FIG. 7 illustrates the general environment of the instant acquisition invention.

Turning now to FIG. 7, wherein a preferred acquisition arrangement is illustrated, preferably the data for the instant invention will be acquired with a boat 705 towing an electromagnetic source (an antenna) 710 below the surface of the ocean 715 in the proximity of receivers 725 (and, optionally, additional receivers 735) that have been placed on the ocean floor 720. The target of interest 730 is most likely to be one or more rock units that may contain hydrocarbons trapped therein. As is indicated in FIG. 7, the electromagnetic energy generated by the source 710 propagates outward from the source, through the water and through the subsurface rocks by various pathways, until some of it eventually encounters the receivers. If a hydrocarbon reservoir is present in the subsurface (as is generally illustrated by reservoir unit 730 of FIG. 7), some of the energy will be reflected and/or refracted off the reservoir and back to the receivers. Although in the preferred arrangement, the instant invention will be most frequently utilized in marine settings, that is not a requirement, and land surveys that implement the techniques discussed herein are specifically within the ambit of the instant invention.

The energy that is sensed by receivers 725/735 is converted to electrical and/or optical signals, and these signals are typically recorded in equipment (not shown separately) associated therewith. The recording equipment as shown is subsequently retrieved and interrogated when the receivers 725/735 are recovered. However, the receivers can also be in a streamer or ocean-bottom cable, and recordings might be transmitted via wire or telemetry to a recording station (not shown separately) that might be in the boat 705 that pulls the source, or in a different boat or on a stationary platform, etc. On land, the recording station would likely be located within a vehicle that is situated proximate to the survey. Irrespective of where the recording station is located, its primary function is to read the digital information from the receivers 725/735 and store that information for later review and/or transmission to a remote processing facility. Of course, those of ordinary skill in the art will recognize that significant processing of t-CSEM data may be done in the field so the procedure of moving the recorded data to a processing center should be regarded as optional for purposes of the instant invention.

Figure 9:
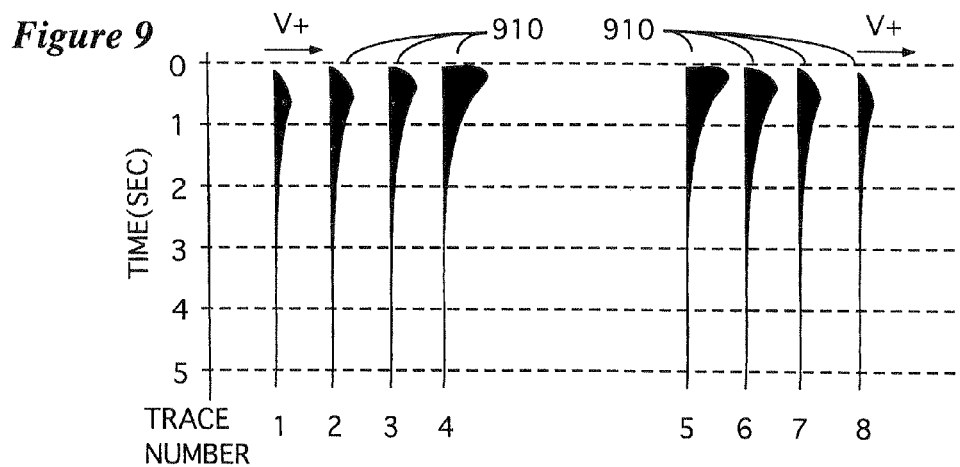
FIG. 9 contains an idealized t-CSEM response to the subsurface hydrocarbon reservoir of FIG. 7.

As is conceptually illustrated in FIG. 9, data traces 910 can be readily displayed with respect to (natural) source actuation time on the vertical axis (preferably with the time axis increasing toward the bottom of the page) and with the observed voltage ("V+") in each trace being plotted on the horizontal axis. In the particular example of FIG. 9, a "stepdown" t-CSEM source signal pattern has been utilized, and the impulse response can be extracted from the raw data by differentiation (as is well known to those skilled in the art). Of course, the resultant signal voltages tend to decrease in amplitude, within each trace (as a function of natural time), and across traces (as a function of distance from the source), i.e., a time-distance characteristic. Within the trace shown is water-born energy (traveling at water velocities), and subsurface energy (traveling at sediment velocities). The exact velocities depend upon the resistivity of the medium, the frequency content of the energy, and the propagation path (e.g., direct or reflected or refracted).

Figure 3:
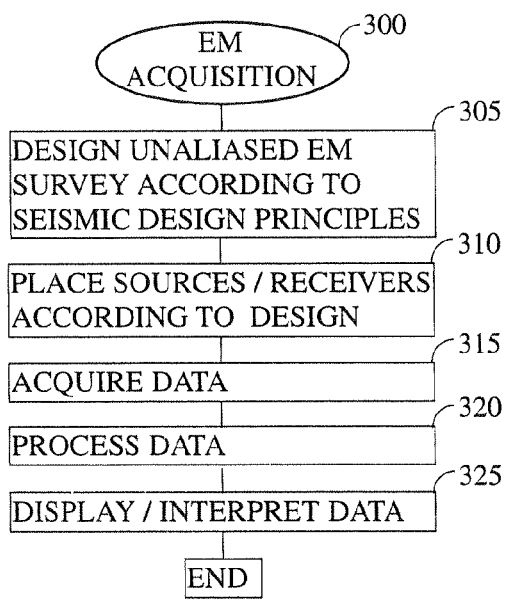
FIG. 3 contains an illustration of a preferred acquisition logic.

According to a first aspect of the instant invention 300 and as is generally indicated in FIG. 3, there is provided a system and method for acquiring t-CSEM data that allows the data so-collected to be utilized and interpreted as though it were conventional reflection seismic data. As a first procedure 305, a survey is designed that is customized to image a particular subsurface target (e.g., rock unit 730 which may contain trapped hydrocarbons). Among the many parameters that might be considered in formulating the survey design are:

the depth of the target formation;

the 3-D structure of the target formation (including its 2-D or 3-D dip, if any);

whether the survey design will utilize a conventional "end on" configuration (e.g., whether only the receivers 725 that are behind the boat or only those ahead 735 will be recording) or a "split spread" configuration (i.e., both receivers 725 and 735 will be recording), or an obliqueshooting design, wherein the sources are located off the line(s) of receivers.

the maximum offset (i.e., the distance from the source 710 to the most distant active receiver 725/735) and minimum offset (i.e., the distance from the source 710 to the closest active receiver 725/735);

the inter-receiver 725 spacing; etc.;

the source-point spacing;

the relation between source points and receiver points (e.g. source points near to receiver points, source points midway between receiver points, etc.);

the frequencies expected in the received data;

the strength of the sources, and the source signature (e.g., step-off, pseudo-random binary sequence, etc.); and the sensitivity of the receivers.

Those of ordinary skill in the seismic art will recognize that the foregoing parameters are routinely considered in the context of a seismic survey. But in the typical t-CSEM context heretofore, most of the foregoing parameters are not considered in survey design, nor are such considerations resolved in a way to optimize further seismic-style processing and imaging of the data. f-CSEM survey design considerations, as disclosed for example by Srnka (U.S. Pat. No. 6,603,313), are not relevant here, as they do not depend upon time-distance characteristics, but only upon distance characteristics. Further, most t-CSSEM practice has been concerned with designing surveys to image relatively simple (e.g., 1-D targets) and the typical number of receivers used in such surveys is so small that proper design is not possible.

As is the case with conventional seismic surveys, it is critical that the EM data be acquired so as to be unaliased in space and time. That is, those of ordinary skill in the art will understand that aliasing occurs when a target is sampled temporally or spatially at a frequency that is above the Nyquist frequency with respect to the frequency content or target dimensions. When speaking with reference to temporal aliasing, the sample rate is key and the choice of that parameter must be made in view of the frequency bandwidth of the signal source, the expected subsurface velocities, the likely thickness of the subsurface target, the attitude (strike and dip) in 3-D space, and other factors well known to those of ordinary skill in the seismic arts. When speaking with reference to spatial aliasing, such factors as source/receiver spacing, distance from the source to the near and far offsets, the number of receivers, etc., can be varied—and often are varied in the seismic context—to guard against under sampling the subsurface. Depending on the estimated dip of the target in the subsurface, its size and depth, the velocities expected to be encountered, the desired Fresnel zone size at the target, etc., there are well known rules of thumb in the seismic arts that provide guidance as to which survey parameters should chosen to produce an unaliased survey.

In the context of EM surveys, however, such concerns have not heretofore been addressed in a general framework, and this is especially true in the case of lateral resolution. Thus, it should be noted that another aspect of the instant invention is the design of unaliased EM surveys according to principles of seismic survey design That is, given an estimate of the subsurface EM velocities (see below) and an estimate of the depth, dimensions, and, orientation of the target, the instant inventors prefer that standard seismic rules of survey design be applied to determine the EM survey parameters including, as specific examples, the receiver spacing, the number of receivers, and distance from the source to the near- and far-offset receivers.

As a next preferred procedure 310, the receivers 725/735 will be placed on either the ocean floor or the surface of the earth (depending upon whether the survey is on land or offshore), according to the specified survey design. Note that one advantage of the instant t-CSEM approach is that much closer offsets can be utilized than would be necessary in the case of, for example, f-CSEM surveys. As a specific example, with many f-CSEM surveys the formation-related signals detected by the receivers nearest the source are typically overwhelmed by the direct signal from the source and, thus, are rendered essentially useless for purposes of subsurface exploration. With typical f-CSEM surveys, the useful receivers are likely to be positioned at distances of about 3-10 km from the source. However, the instant invention can utilize receivers that are located at distances between zero and 3 kilometers from the source. This is possible because t-CSEM methods activate the source and then thereafter deactivate it, so that signals can be collected from the receivers during periods 6f time in which no energy is emanating from the source, thus minimizing difficulties from the so-called "direct" signal, and the so-called "air wave".

In one preferred embodiment, the source will be moved along a line of receivers 725/735 (FIG. 7), but in other embodiments the receivers 725/735 will be laid out in a 2-dimensional pattern across the surface of the earth (or on the water bottom), thereby yielding a 3-D image of the subsurface when the data have been properly collected, organized, processed, and analyzed. Note that a 3-D arrangement of receivers, such as the foregoing, is heretofore not known in the t-CSEM (or f-CSEM) arts, but is well known in the reflection seismic arts.

Note that, in 3-D P-wave seismics, the source is usually a monopole (radiating equally in all azimuths), whereas in 3-D CSEM, the source is usually a horizontal dipole (radiating differently in different azimuths). In this respect, the 3-D t-CSEM survey is more like a 3-D shear-wave survey, in which the polarization direction of the source is critical (cf, e.g., Thomsen, L., 1988, *Reflection Seismology in Azimuthally Anisotropic Media*, Geophysics, 53(3), 304-313), and similar survey-design considerations apply. For example, the resulting (X, Y, TIME) data at each receiver may be linearly transformed, at each TIME, into (RADIAL, TRANSVERSE, TIME) data, using a trigonometric transform well known to those skilled in the seismic arts, so that the new RADIAL component points in the horizontal azimuth from source to receiver, and the new TRANSVERSE component is perpendicular to that, with a specific "right-handed" chirality convention.

In 2-D EM surveys, the "shots" (i.e., activations of the source 710) will preferably be taken when the source is above or proximate to one of the receivers 725/735, thereby creating the possibility (as is discussed more fully hereinafter) of organizing the information so-recorded into "common mid point" (CMP) or "common image point" (CIG) gathers as is typically performed in seismic data acquisition. In 3-D EM surveys, approximate CMP or CIG gathers may be constructed by "binning" procedures, similar to those used in 3-D seismic surveys. Of course, organization of individual EM trace recordings from a 2-D or 3-D reflection seismic survey into CMP or CIG gathers is well known in the seismic arts.

As a next preferred procedure 315 (FIG. 3), data will be acquired by activating the sources 710 (FIG. 7) and recording the voltages that are sensed at the receivers 725/735. The preferred source 710 is a horizontally disposed wire, grounded at both ends to the Earth or to the water, connected to an electric generator that can be controlled so as to provide an impulsive source signature, or a signature that can be processed to yield the equivalent of an impulse. In one preferred arrangement, a "step down" signal will be generated (i.e., direct current to the transmitter antenna or electrodes will be turned on for an extended period, then abruptly turned off) and the resulting voltages recorded during the period that follows.

However, it has been recognized that more complex transmitter signals might be utilized than the simple "step down" function or similar signals known to those in the t-CSEM arts. As a first specific example, a pseudo-random series of short binary pulses will be generated by the source, with the receivers 725/735 continuously recording while the entire series of pulses is generated. Of course, it is anticipated that additional processing will be required to benefit from this sort of signal.

Those of ordinary skill in the art will recognize how such a source could be utilized with conventional seismic data and the sorts of operations that would be necessary to remove the effect of the extended source signal from the recorded data. After application of the processing methods discussed hereinafter, such seismic-based methods will be appropriate for use with the voltage vs. natural time recordings preferably obtained from the EM receivers. Note that the use of such a pseudo-random series of pulses, further treated with the processing methods discussed hereinafter to create an impulsive source signature, is heretofore unknown in the t-CSEM arts.

In still another preferred arrangement, a frequency sweep (analogous to the sweeps that are commonly utilized by vibrators during land seismic-data acquisition) will be generated by the source. That is, the current that is applied to the source 710 will be in the form of sine-wave alternating current swept through a range of frequencies, preferably beginning with a predetermined upper frequency and ending with a predetermined lower frequency (e.g., an downward sweep over a frequency range of about 10 Hz to 0.1 Hz). As was mentioned previously, it is anticipated that the recorded data will undergo post-acquisition impulse-equivalent signal recovery analogous to the cross-correlation techniques that are used with seismic vibrator data, including corrections for attenuation and dispersion before or after such impulsive-signal recovery. Note that such a source signal is heretofore not known in the t-CSEM arts.

As a next preferred procedure at 320 (FIG. 3), the data acquired at 315 will be processed in such a fashion that thereafter they can be interpreted in a manner similar to that of conventional seismic data. The importance of this procedure will be discussed in greater detail below but, in brief, after processing at 320 according to the methods taught herein, the recorded t-CSEM data will resemble and may generally be interpreted in the same manner as reflection seismic data.

Finally, the data will preferably be displayed and/or interpreted (at 325) for the purpose of locating subsurface rock units that contain targets that are of potential economic interest for their hydrocarbon content. As is conceptually illustrated in FIG. 10, the t-CSEM data traces 920 will preferably be corrected by the methods of the instant invention for dispersion/attenuation, producing traces that can be processed as if they were natural time-domain seismic traces 1010. Further, and in a noise-free environment, such t-CSEM data would be expected to yield a clear image of the dipping hydrocarbon reservoir 730, after the manner of seismic imaging. Note that the reservoir 730 is shown in phantom in FIG. 10 because it would not normally be a part of the seismic data display. It has only been added to FIG. 10 to make clearer the character of its expression in the data after processing by the methods taught herein.

In the case of exploration for hydrocarbons, the ultimate goal is to locate economic quantities of trapped oil and/or gas within the subsurface. That being said, it is possible that the invention described herein could be used to locate other sorts of targets (e.g., minerals, etc.). Note that data that are so acquired, processed, and displayed will resemble conventionally acquired reflection seismic data. According to another preferred embodiment, there is provided a data processing method 400 (FIG. 4) that transforms raw t-CSEM data so that it can be processed similarly to those of conventionally acquired seismic data, taking advantage of its time-distance characteristics. That is, natural time t-CSEM data show the time-distance characteristics of seismic data and, after treatment according to the methods taught herein, are amenable to processing by any number of seismic processing algorithms known in the art. Note that, to realize these processing steps, the data must not be transformed to logarithmic time, as is taught by Ziolkowski and Hobbs, 1998, cited previously.

Figure 4:
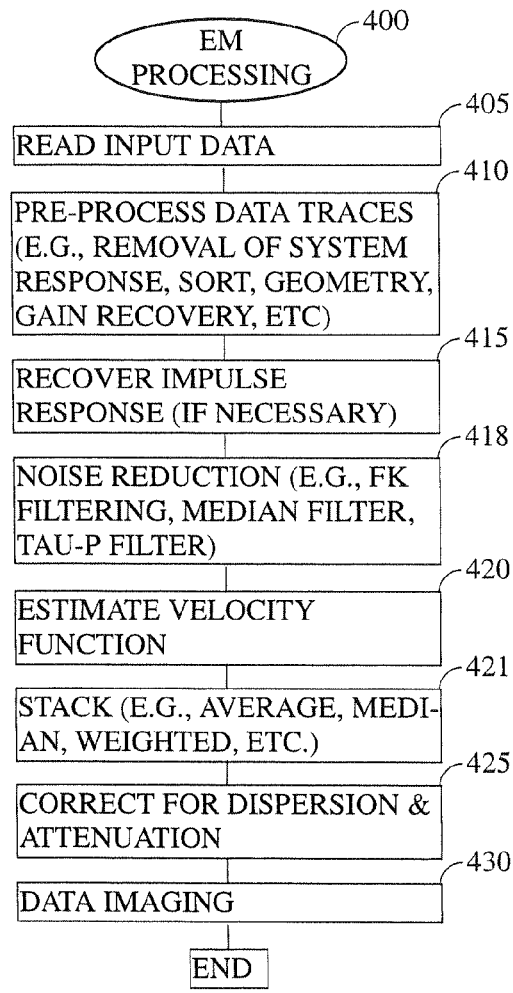
FIG. 4 illustrates a preferred t-CSEM processing logic.

As is indicated in FIG. 4, in a first preferred procedure the input t-CSEM data that were previously acquired (at 315 in FIG. 3) will be read. Note that the data that are read at 405 may not be the actual t-CSEM data traces that were recorded in the field, but, instead, might be a representation of that original data (e.g., the original data may have been filtered, amplified, etc., according to methods well known to those of ordinary skill in the art). Hence, for purposes of specificity in the text that follows, it will be assumed that the data being read at 405 might have been pre-processed in appropriate ways. Note, that this same comment should be understood to also apply to the other methods discussed herein that similarly begin by reading t-CSEM data traces as input, e.g., in FIG. 6, at 605. It is preferable, and often mandatory, that any such preprocessing be linear, in the mathematical sense.

As a next preferred procedure (to the extent such has not been performed already), various pre-processing algorithms will be applied to the recorded t-CSEM data. As specific examples of the sorts of algorithms that might be applied, it is preferable that the acquisition geometry information be determined for each t-CSEM trace (i.e., preferably each t-CSEM trace will be associated with specific locations on the Earth, indicating where the receiver that acquired that data was located, and where the source was located). Other operations that might be performed at this stage include sorting (e.g., into common-mid-point gathers), gain recovery (see, e.g., 425, hereinafter), time-variant gain control etc.

As a next preferred step, at 415, the impulse response will be recovered (if necessary) from the recorded t-CSEM data. Note that whether or not this procedure will be performed will depend on the source signature that was used to acquire the data. If the data are obtained by recording a "swept" signal (as was discussed previously), a cross correlation would likely be performed between a pilot signal (usually obtained from a "near field" receiver or sensor or, in some cases, the actual input source signal could be used) and the recorded t-CSEM data. On the other hand, if the source signal was a "step off" signal, it would be appropriate to calculate a first time derivative of the input data traces. Alternatively, a linear filter might be applied to approximately shape the source signature into an impulse, using methods well known to those skilled in the seismic arts.

Next, the instant method will preferably determine a velocity function for the data according to methods well known in the seismic arts (step 420) and apply noise reduction of the sort that would typically be applied to 2-D or 3-D seismic data (at 418). Usually the data are not substantially free of noise at this point in the process. The data may be contaminated by many different types of noise, some of which can be largely eliminated or attenuated by means familiar to those skilled in the seismic arts. These means are additional to noise-attenuation techniques specific to electromagnetic data (cf., e.g., Strack, 1992, cited previously). In particular, there is likely to be (at least in the marine context) source-generated water-borne noise, which is preferably attenuated or separated from the signal of interest at this point in the processing sequence. Also, there will likely be source-generated noise refracted at the water-sediment interface (the water bottom), and perhaps in the near subsurface. All such noise typically arrives at the receivers with a different apparent velocity (a time-distance characteristic) than the reflected/refracted signal that arrives from the subsurface. Therefore, since the data will preferably have been acquired with a suitable survey design, such noise may be attenuated by a variety of algorithms that are familiar to those skilled in the seismic arts. For example, an f-k (frequency-wave number) filter might be applied to remove coherent noise, or a tau-p (intercept-slowness) filter could be used to restrict the range of dips present in the data, a velocity filter could be used to attenuate events traveling in certain velocity ranges, a mute could be applied to remove data within a particular window of the data, etc.

Some differences between seismic and EM noise should be noted. For example, whereas in seismic data, seismic noise may be substantial, and caution must be used to avoid amplifying noise in an attempt to amplify attenuated signal, this is a smaller problem in marine EM data, since the overlying water layer serves to attenuate natural noise in the appropriate frequency band. Further, source-generated noise (e.g., following non-direct wave paths) can be managed using appropriate survey design of source-signature and source-receiver offset, to minimize this problem. Finally, whereas in seismic data, dispersion is generally a weak effect (and may be neglected in some applications), in EM data it is strong and must be handled properly. However, since the preferred correction is of the deterministic functional form discussed below, it is generally not a major source of uncertainty.

As a next preferred step 421, in some preferred embodiments the sorted and shaped t-CSEM traces will be stacked to further enhance the common signal contained therein. A conventional average/sum-type stacking operation could be performed or, for example, well known stacking alternatives such as weighted, median, etc., stacks. Note it is known in the prior art to stack EM traces that are obtained by repeating the same source-receiver experiment. However, stacking within the context of the instant invention refers to combining EM traces from different source-receiver pairs that have been time-shifted to account for travel-time differences.

In addition, other operations which do not necessarily rely on the time-distance characteristics of the data might be applied. For example, longitudinal median filters might be utilized to remove spikes from the input data. (Note that, in the seismic arts, "median filtering" is a single-trace, sliding-window operation, different from an operation known in the electromagnetic arts as "median stacking" [or, more generally, "selective stacking", cf., e.g. Strack, 1992, cited previously], which is applied to a set of replicate traces taken with the same source and receiver positions). Other commonly used noise reduction filters such as a time-variant smoothing filter (Strack, 1992, cited previously) may also be applied. Those of ordinary skill in the art will recognize that many such noise-reduction/data enhancement operations might be performed on the t-CSEM data. It is preferable, and in most cases important, that this noise be removed prior to the next procedure, wherein the data are corrected for dispersion and attenuation according to its path of energy propagation.

Figure 6:
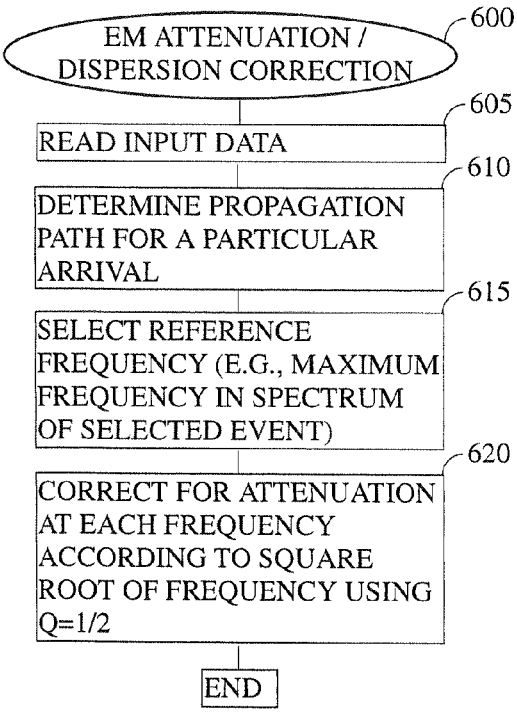
FIG. 6 contains a preferred operating logic for t-CSEM gain correction.

As a next preferred procedure, at 425, a correction for dispersion and attenuation will preferably be applied to the t-CSEM data. This procedure is of particular importance to the effective operation of the instant invention. The principal elements in this process 425 are illustrated in FIG. 6. The preferred dispersion/attenuation correction 600 is performed as follows. First, the input data will be read or otherwise accessed (at 605). Next, an arrival will be selected within the t-CSEM data, and an energy travel path between the source and each of the receivers determined for such arrival (at 610). Note that, in conjunction with this procedure, energy traveling along different paths should have been attenuated or separated by the noise-reduction operations discussed previously. Further, note that in conjunction with this procedure, it might be desirable to calculate a velocity function from the t-CSEM data (step 420). Those of ordinary skill in the art will realize that such functions are routinely calculated for seismic data, and similar techniques could be applied here (e.g., picking arrivals, coherency velocity analyses, constant-velocity stacks, tomographic analysis, logs, etc.). However it is determined, preferably at least a single-valued velocity function (i.e., a velocity function that varies only with time, or depth) will be determined from the input data. It would be preferable in most cases, though, to use a 2-D or 3-D velocity function (i.e., one that varies in 2 or 3 dimensions), such as would typically be determined for similar seismic data. Such a velocity function would necessarily vary with frequency (at each position) according to the principles set out below.

In some preferred embodiments, the energy travel path will be calculated by using ray tracing between the source and receiver using standard ray-tracing principles (e.g., Snell's law) applicable to seismic data. One object of the ray trace calculation is to obtain the length of the travel path "$R_0$" between the source and receiver for a given arrival in the data.

Figure 8:
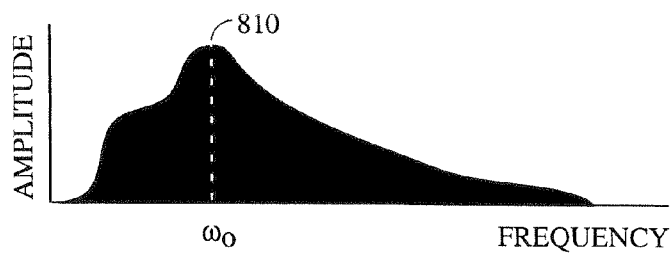
FIG. 8 illustrates how a central frequency might be selected.

Next, a reference frequency $\omega_0$ (i.e. a specific angular frequency, in units of inverse natural time) will be selected 615 for the event (arrival) under consideration. The reference frequency will preferably be selected by calculating a Fourier-transform amplitude spectrum of the event in question and selecting the natural frequency that has the largest magnitude associated therewith (see, e.g., 810 in FIG. 8).

Finally, the process of the instant invention will preferably correct the t-CSEM traces for energy attenuation and dispersion at each frequency according to the square root of frequency using $Q=½$, where "Q" is the well known "quality factor" of seismic prospecting and analysis. The preferred method of correcting for attenuation and dispersion at each natural frequency $\omega$ is via a convolution (filtering) using a filter whose Fourier-domain representation is, at each frequency $$\exp[+\omega R_0/V_{phs}+i\omega(R_0/R_{phs}-R_0/V_0)],$$

where $$V_0 \equiv V_{phs}(\omega_0)=\sqrt{2\omega_0\rho/\mu},$$

$R_0$ is the length of the travel path from the source to the selected event, and $\omega_0$ is the reference frequency. Note that the first summand in the exponential is intended to correct for the effects of attenuation and the second for dispersion and, in fact, it would be possible, although not preferred, to correct for one effect, the other, or both according to how the previous equation is applied to the data. $V_{phs}$ is preferably defined as follows $$V_{phs}(\omega)=\sqrt{2\omega\rho/\mu},$$

where $\rho$ is the formation resistivity, and $\mu$ is the magnetic permeability of the intervening rock units. If these material parameters vary along the inferred signal travel path, the filter definition above must be adjusted accordingly, as will be understood by those skilled in the seismic arts. Those skilled in the seismic arts will be familiar with a corresponding seismic expression, wherein the leading term (compare with the above) is $$\exp[+wR_0/2QV_{phs}]$$

where, in the seismic context, the quality factor Q is an unknown physical parameter to be determined. A distinguishing characteristic of t-CSEM propagation is that (from well-established theory) $Q=½$ identically, i.e., at least in theory it is not a material parameter, and will generally not need to be determined by the explorationist. In fact, under this assumption, it disappears from the filter defined above, since it is multiplied by the constant "2" in the denominator.

With that said, those familiar with the seismic or electromagnetic arts will be aware that it is the combination $$\omega R_0/V_{phs}(\omega) = \omega R_0 2 Q_{EM} V_{phs}(\omega)$$

which is most important, rather than the values of its constituent parts. If the path length $R_0$, or the velocity $V_{phs}$ is uncertain, one might attempt to account for such uncertainty by adjusting the value of $Q_{EM}$ away from its theoretical value of 2. This should be viewed as an empirical procedure, unsupported by theory, but within the ambit of the instant invention.

Note that the preceding convolution goes to the heart of one aspect of the instant invention. After correction for attenuation/dispersion as described above, the t-CSEM data traces will have been converted so that they can be imaged and interpreted in a manner similar to seismic data traces by exploiting their time-distance characteristics.

Figure 5:
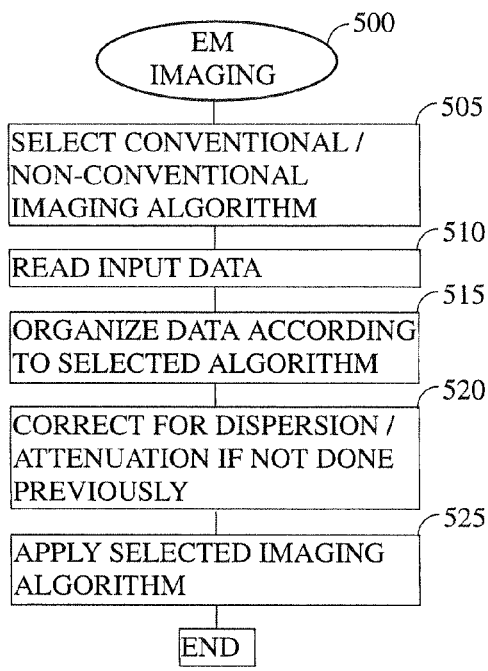
FIG. 5 contains a logic diagram of a preferred t-CSEM imaging logic.

Now, given that the t-CSEM data, and especially t-CSEM data acquired and processed as explained above, have the time-distance characteristics of seismic data, traditional and non-traditional methods of seismic imaging (shown at 500) will preferably next be applied. For example, and as is illustrated in FIG. 5, as an initial procedure it is preferred that an imaging algorithm be selected (at 505). Imaging algorithms include, for example, stacking, or migration (in time or depth, prestack or poststack). More broadly, other processes that sharpen or otherwise enhance the image might also be performed, such as inversion of the data for the parameters of predetermined models, etc. As a consequence, when the term "imaging algorithm" is used herein, that usage should be broadly construed to include any algorithm that is suitable for use on seismic data and that is designed to improve the quality of the image that is obtained therefrom including, without limitation, any sort of processing, including deconvolution, wavelet shaping, statics, velocity analysis, time-offset correction (e.g., NMO), filtering, muting in a window, pre-stack imaging (e.g., pre-stack migration, DMO, etc.), stacking, gain correction, post-stack imaging (e.g., post-stack migration), or inversion, as well as the generation of any attribute, for example instantaneous phase, Amplitude Variation with Offset, etc.

After an imaging algorithm has been selected, the transformed t-CSEM data will be read (at 510), organized (at 515), and processed (at 525) using imaging procedures applicable to seismic data. Note that the organization 515 might include sorting the filtered t-CSEM data into CMP gathers in preparation for stacking, sorting to common-offset gathers, etc. The algorithms for performing such 2-D and/or 3-D operations on seismic data are very well known to those of ordinary skill in the seismic arts.

In those instances where the selected processing algorithm requires that the user provide a velocity function (e.g., both stack and migration require a velocity function), such might be obtained by any number of conventional methods using the processed t-CSEM traces as though they were unstacked seismic traces, and analyzing, for example, moveout to determine a velocity function. The velocity function may be of isotropic or anisotropic nature. If the velocity function is anisotropic, it may indicate polar anisotropy or azimuthal anisotropy. If azimuthally anisotropic, certain complications arise. See, for example, the seismic shear-wave discussion in Thomsen (2002), i.e., Thomsen, L., 2002, *Understanding Seismic Anisotropy in Exploration and Exploitation*, Society of Exploration Geophysicists, for a discussion of such complications in the seismic context.

Note that if such has not been performed already, the correction for dispersion and attenuation discussed previously (at 520 and FIG. 6) is preferably performed before the actual imaging algorithm is applied (at 525).

Furthermore, the invention disclosed herein discusses t-CSEM in terms of seismic traces organized into "CMP" or common-offset gathers, that is done for purposes of specificity only and not out of any intent to limit the instant invention to operation on only that sort of gather. So, within the context of this disclosure, the term gather is used in the broadest possible sense of that term, and is meant to apply to conventional 2-D and 3-D CMP gathers, as well as to other sorts of gathers that might include, without limitation, Common-Image-Point gathers, Common-Receiver gathers, Common-Source Gathers, Common-Offset gathers, etc., the most important aspect of a "gather" being that it represents a collection of unstacked data traces from either a 2-D or 3-D survey, organized according to a principle based on one or more aspects of the survey geometry.

Additionally, it should be noted that although most of the examples given herein were concerned with marine surveys, technology of the instant invention could be employed onshore, if the attendant logistical issues (e.g., coupling of sources and receivers to the ground) are resolved. See Wright et al., U.S. Pat. No. 6,914,433, for additional discussion.

Additionally, we envision the processing of the electromagnetic data to be done either sequentially or concurrently to seismic data processing covering the same volume (if available). When processed concurrently, it can be done in cooperative fashion in which one method feeds intermediate results to the other to develop constraints, or in a more formalized integrated fashion using well known methods such as joint inversion. (Strack, 1992, cited previously).

Figure 10:
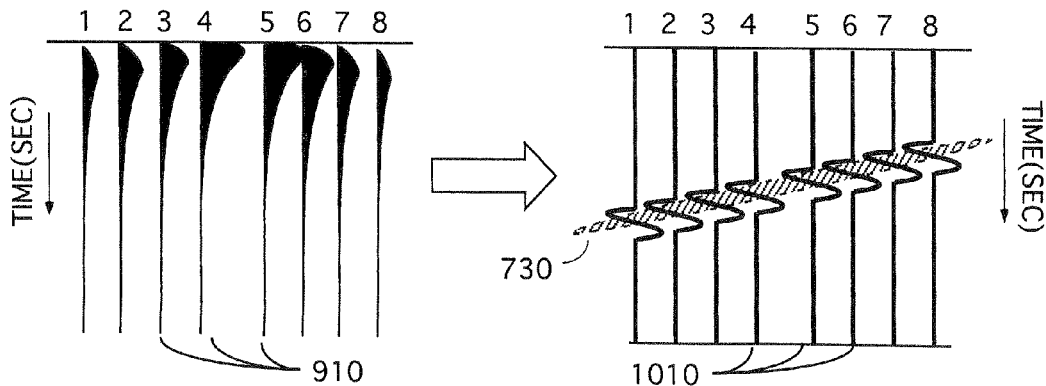
FIG. 10 conceptually illustrates how the instant invention operates to transform t-CSEM data to data that are comparable to reflection seismic data.

Finally, FIG. 10 illustrates conceptually how EM traces might be processed by the instant invention to provide a view of a hydrocarbon-containing unit in the subsurface. As is generally indicated in this figure, with acquisition and processing according to the instant invention EM will generally take the characteristics of—and be interpreted very much like—conventional seismic data.

Technical Discussion

The instant invention concerns CSEM, and in particular t-CSEM techniques, to be applied in both land and marine contexts, although the preferred embodiment is the marine context. The transient-source character of t-CSEM techniques is similar to that of seismic techniques, which typically employ impulsive (marine) or "swept" (land) sources. In fact, a broad understanding that seismic techniques and electromagnetic techniques are somehow analogous is also well known, e.g., see Ursin, B, 1983, *Review of elastic and electromagnetic wave propagation in layered media*: Geophysics, 48, 1063-1081. However, the analogy is not exact, so that many seismic techniques cannot be applied to EM data without modification.

In more particular, it is well known in seismic data processing that seismic data for hydrocarbon exploration, appraisal, production and development should be processed to suppress the noise, while enhancing the signal if possible. Often, this is done by recognizing the time-distance characteristics of such data. As examples:

The data may be f-k filtered. Here, the time-distance characteristics of the data are explicitly involved, since the filtering is done simultaneously in terms of frequency (the complement of time) and wave number (the complement of distance).

The data may be τ-p filtered.

The data may be median or robust filtered.

The data in a window delimited in time and vector or scalar offset may be muted.

The data may be corrected for dispersion and attenuation. These concerns have been fully understood by seismic practitioners for decades, but not at all by EM practitioners, since

- most Controlled-Source ElectroMagnetic practice in the hydrocarbon context has been f-CSEM, hence unable to utilize the time-distance characteristics of the data.
- most t-CSEM practice has been very primitively designed, using few receivers so that proper time-distance processing is not possible.

Science Background

As a starting point, consider the basic physics which establishes the EM-seismic analogy; this in itself (although well-established) is non-trivial and not understood by many expert practitioners of either seismics or EM.

Seismics

Starting first with an elastic seismic theory, the simplest approach is through the wave equation for an isotropic homogeneous medium:

$$\delta \partial^2 \vec{u} = M \nabla^2 \vec{u} \quad (1)$$

where $\vec{u}(\vec{x},t)$ is the particle displacement vector (variable in space $\vec{x}$ and natural time t), and $\nabla$ and $\partial$ are conventional notation for partial differential operators in space and time, respectively. The medium is characterized by M (the deformation modulus) and $\delta$ (the density). For elastic media, M is real (and different for different wave-types); for anelastic media it is complex.

We seek harmonic solutions to (1) of the form $$\vec{u}(\vec{x},\omega) = \vec{u}_0(\omega) G_{defm}(\vec{x}) \exp(i\omega t) \quad (2)$$

In elastic wave theory, the sign of the phase $i\omega t$ in the oscillatory second term above is immaterial, but in anelastic wave theory, it is crucial that it be chosen as above, so that (with positive angular frequency $\omega$) phase increases with increasing time.

Then from (1) and (2), the equation for the spatial deformation function $G_{defm}$ is:

$$(\nabla^2 + K^2) G_{defm} = 0 \quad (3)$$

where the wavenumber K is given by:

$$K = +\omega\sqrt{\delta/M} \quad (4)$$

with solution $G_{defm}(R) = \exp(-iKR)$ for propagation in any radial direction $B = |\vec{x}|$. The positive square root is the only root that is physically permissible, according to the Second Law of Thermodynamics.

Now separating the real and imaginary parts of M, the modulus (whether for P or S waves) can be written in complex form as $$M = M_R + iM_I \quad (5)$$

The (implicit) frequency-dependences of $M_R$ and $M_I$ are connected by the "Kramers-Kroenig relations"; these dependences are physical (not mathematical) in nature, and are poorly understood, in general, with a complicated frequency dependence depending on poorly known physical parameters.

It is conventional (cf, e.g., O'Connell and Budianski, 1978) to define the quality factor $Q_{defm}$ for deformation through:

$$Q_{defm} \equiv \frac{M_R}{M_I} \quad (6)$$

It is a requirement of the Second Law of Thermodynamics that $Q_{defm}$ is non-negative. (Further, it is a requirement for deformational stability that $M_R$ is non-negative, hence $M_I$ is also non-negative.)

The expressions for the real and imaginary parts of K involve fourth powers of $Q_{defm}$, and are not very enlightening. Instead, we define the real and imaginary parts of the velocity v by:

$$v = v_R + iv_I = \sqrt{M/\delta} \quad (7)$$

with $$v_R = \sqrt{\frac{M}{\delta}} \left[1 + \left(\sqrt{1 + 1/Q_{defm}^2} - 1\right)/2\right]^{+1/2} \quad (8a)$$

and $$v_I = \frac{1}{2Q_{defm}} \sqrt{\frac{M}{\delta}} \left[1 + \left(\sqrt{1 + 1/Q_{defm}^2} - 1\right)/2\right]^{-1/2} \quad (8b)$$

so that the real and imaginary parts of the wave number are given, in these terms, by $$K = \frac{\omega}{v} = \frac{\omega}{v_R^2 + v_I^2}(v_R - iv_I) \equiv \left(\frac{\omega}{v_{phs}} - i\alpha\right) \quad (9)$$

where the last expression implicitly defines the (real) seismic phase velocity $v_{phs}$ and attenuation coefficient $\alpha$.

Finally, the plane wave (2) becomes $$\vec{u}(\vec{x},\omega) = \vec{u}_0(\omega)\exp[-\alpha R] \exp[i\omega(t - R/v_{phs})] \quad (10)$$

The wave attenuates as it propagates (with the opposite phase convention, it would grow exponentially instead).

This entire development is valid for any magnitude of $Q_{defm}$. However, in normal seismic contexts, the attenuation is small, i.e., $Q_{defm} \gg 1$ (and the corresponding frequency dependence of $M_R$ and $M_I$, and of $v_{phs}$ and $Q_{defm}$, is modest). In the limit of large $Q_{defm}$, $$v_{phs} \approx v_R \approx \sqrt{M/\delta} \quad (11a)$$

$$\alpha \approx v_I/v_R^2 \approx \frac{\omega}{2Q_{defm} v_{phs}} \quad (11b)$$

so that the wave number is approximately:

$$K \approx \frac{\omega}{v_{phs}}\left(1 - \frac{i}{2Q_{defm}}\right) \quad (12)$$

In fact, an operational definition of seismic attenuation (independent of broader considerations of deformation in other contexts) can be based upon (12) instead of (6), by defining $$K \equiv \frac{\omega}{v_{phs}}\left(1 - \frac{i}{2Q_{seis}}\right) \tag{13}$$

regardless of the magnitude of $Q_{seis}$, with corresponding changes to the definitions of $v_{phs}$ and $Q_{defn}$. If $Q_{seis}$ is small, then the frequency dependence (the "dispersion") of $v_{phs}$ and $Q_{seis}$ is large. Whether or not $Q_{seis}$ is small, the displacement can be written as $$\vec{u}(\vec{x},\omega) = \vec{u}_0(\omega)\exp[-\omega R/2v_{phs}Q_{seis}]\exp[i\omega(t-R/v_{phs})] \tag{14}$$

There is a vast literature developing methods to use (14) for imaging and characterizing the earth's subsurface, under the restriction that $Q_{seis}=\infty$. There is a small literature developing methods to so use (14), under the assumption that $Q_{seis}$ is large but finite, mostly directed towards adjusting seismic data to remove the effects of finite $Q_{seis}$.

Electromagnetics

Two of Maxwell's equations as applied to a uniform isotropic medium may be written as:

$$\nabla \times \vec{E} = -\mu \partial \vec{H}$$

$$\nabla \times \vec{H} = (\sigma + \in \partial)\vec{E} \tag{15}$$

where $\vec{E}$ is the electric field (variable in space $\vec{x}$ and time t), $\vec{H}$ is the magnetic field, and the medium is characterized by $\in$ (the dielectric constant), $\mu$ (the magnetic permeability), and $\sigma$ (the electrical conductivity). These equations have been well known for over a century, and form the basis for all classical electromagnetic phenomena, in the linear range where Ohm's "law" applies.

Taking the curl ($\nabla \times$) differential operation on these equations, and using the well-known differential identity $[\nabla \times (\nabla \times) = \nabla(\nabla \cdot) - \nabla^2]$ to eliminate $\vec{H}$, yields Maxwell's wave/diffusion equation for the electric field:

$$\nabla^2 \vec{E} - \mu \in \partial^2 \vec{E} - \mu \sigma \partial \vec{E} = 0 \tag{16}$$

and an identical equation for $\vec{H}$, showing that both must propagate together.

We seek harmonic solutions to (16) of the form $$\vec{E}(\vec{x},\omega) = \vec{E}_0(\omega)G_{EM}(\vec{x})\exp(i\omega t) \tag{17}$$

Note that this is the same convention as that used above, in the seismic context, and opposite to that used by Ursin 1983, cited previously.

The spatial electromagnetic function is the solution to $$(\nabla^2 + k)G_{EM} = 0 \tag{18}$$

where the wavenumber k is given by $$k = \omega\sqrt{\mu\varepsilon(1 - i\sigma/\omega\varepsilon)} \tag{19}$$

$$= \frac{\omega}{nc}\sqrt{1 - i\frac{(nc)^2\mu}{\omega\rho}}$$

In the rearrangement on the right $\rho=1/\sigma$ is the electrical resistivity, n is the "index of refraction", and c is the speed of light in vacuum, about $3*10^5$ km/s; $nc=1/\sqrt{\mu\in}$. In a vacuum, $\rho=\infty$, and $n=1$, so that the second term on the right hand side of (19) is zero, and $c=\omega/k$ is the speed of light.

At high frequencies in rock (the "displacement current regime"), the second term in (19) is small, and the wave propagates as radar, with velocity nc. But, at these high frequencies, the wavelengths are very short, so that the small second term attenuates the wave to virtually nothing after a short penetration distance.

At sufficiently low frequencies (the "Conduction current regime"), the second term dominates, so that $$k \approx \sqrt{-i\omega\mu/\rho} = \sqrt{\omega\mu 2\rho}(1-i) \equiv \kappa(1-i) \tag{20}$$

defining the scalar wavenumber $\kappa$. This occurs whenever $$\omega << \omega_{crit} \equiv \frac{(nc)^2\mu}{\rho}; \tag{21}$$

this is quantified further below.

Under these conditions, the phase velocity is:

$$V_{phs} = \frac{\omega}{\kappa}$$

$$= \sqrt{\frac{2\omega\rho}{\mu}}$$

and the group velocity is $$V_{grp} = \frac{\partial \omega}{\partial \kappa} \tag{22}$$

$$= 2V_{phs}$$

For non-magnetic rocks, $\mu=\mu_0=4\pi 10^{-7}$ H/m, the magnetic permeability of vacuum. For typical sedimentary rocks, the resistivity is of the order of $\rho=1$ ohm-m, so that at a frequency of 1 Hz the phase velocity $V_{phs}$ is 3.16 km/s, comparable to the speed of sound. $\rho$ may be a weak function of $\omega$, but the main frequency dependence of $V_{phs}$ is the explicit square-root dependence shown above.

Using (22) in (21), the critical frequency separating the displacement and conduction regimes is $$f_{crit} \equiv \frac{(nc)^2\mu}{2\pi\rho} = 2f_0\left(\frac{nc}{V_{phs}(f_0)}\right)^2 \approx 2 \cdot 10^8 \text{Hz}$$

where the numerical result assumes $f_0=1$ Hz, and $n=0.1$. This is so high that all the frequencies used to probe deeply into the earth are well within the conduction regime, justifying the use of Equation (20).

At such low frequencies, the plane-wave solution to (16) is $$\vec{E}(R,\omega) = \vec{E}_0\exp[-\kappa R]\exp[i(\omega t - \kappa R)] \tag{23}$$

$$= \vec{E}_0\exp[-\omega R/V_{phs}]\exp[i\omega(t - R/V_{phs})]$$

Of course, there is a similar expression for the magnetic field $\vec{H}$. This EM expression bears a strong resemblance to the seismic expression (14); the principal differences are:

In the seismic case, there is only one field, whereas in the EM case, $\vec{E}$ and $\vec{H}$ are coupled, and propagate together.

The first (attenuating) term in the EM case lacks a factor $\frac{1}{2}Q$ in the exponent; this is equivalent to defining an electromagnetic $Q_{EM}=\frac{1}{2}$.

The EM phase velocity $V_{phs}$ is strongly frequency dependent (cf. Eqn. (22)), whereas the seismic phase velocity $V_{phs}$ is only weakly frequency dependent.

Q-Deconvolution of Electromagnetic Waves

In the instant invention, as a first step CSEM data are acquired:
preferably in a marine environment, with a source towed near to the seafloor;
preferably with an impulsive source signature, or other source signature that is suitable for time-domain processing; and,
preferably with many seafloor receivers distributed with a variety of source-receiver offsets.

Those of ordinary skill in the art will recognize that many variants and alternatives to the foregoing preferences are certainly possible and well within the scope of the instant invention.

Next, the raw EM data records are preferably preprocessed (in various ways familiar to those knowledgeable in conventional CSEM processing methods) for instrument corrections, navigation assignment, water-wave removal, etc.

The effects of EM attenuation and dispersion are then preferably removed from the data. Preferably, a convolution-based method will be utilized; other implementations of the basic idea (e.g., via migration, are straightforward).

In this exploration context, the propagation distance R can be specified by assuming a single reflection within a uniform layer, approximated by $R=\sqrt{t_0^2 V_{phs}^2 + x^2}$ where $t_0$ is the time of arrival of the event in (2) and x is the source-receiver offset. (More complex relations defined by an inhomogeneous and/or anisotropic subsurface, are obviously possible, obvious to those skilled in the art, and included in this invention.)

Because of the dispersion (cf (22)), the energy arrives over an extended time interval, even though the bandwidth of the source is finite. Since we want to localize the arrival of the Q-corrected energy, we add and subtract a constant-velocity term in (23):

$$\vec{E}(R, \omega) = \vec{E}_0 \exp[-\omega R/V_{phs}] \exp\left[i\omega \left( \frac{t - R/V_{phs} +}{R_0/V_0 - R_0/V_0} \right)\right] \quad (24)$$

$$= \vec{E}_0 \exp\left[ \frac{-\omega R/V_{phs} - i\omega}{(R/V_{phs} - R_0/V_0)} \right] \exp[i\omega(t - R_0/V_0)]$$

where $$V_0 \equiv V_{phs}(\omega_0) = \sqrt{2\omega_0 \rho/\mu},$$

$$R_0 = \sqrt{t_0^2 V_0^2 + x^2},$$

and $\omega_0$ is a reference frequency, typically chosen near the center of the received bandwidth.

Multiplying this Fourier transform by the inverse of the first factor yields, $$\vec{E}(R,\omega)\exp[+\omega R/V_{phs}+i\omega(R/V_{phs}-R_0/V_0)]=$$
$$\vec{E}_0(\omega)\exp[i\omega(t-R_0/V_0)] \quad (25)$$

Upon inverse Fourier transformation, the left side of (25) defines the preprocessed data $\vec{E}(R,\omega)$, convolved with a filter which simultaneously corrects for the attenuating and dispersing effects of the propagation. The right side represents a band-limited impulsive arrival, with a delay given by $R_0/V_0$. The required filter which produces this has representation (in the Fourier domain)

$$\exp[+\omega R_0/V_{phs}+i\omega(R_0/V_{phs}-R_0/V_0)] \quad (26)$$

Implicit in this expression is the source-receiver offset x (known), and the arrival time $t_0$, which shows that the filter is a dynamic one, varying in its definition as a function of trace time and energy propagation path. The filter (25) diverges at high frequency; in practice this is not a problem because the incident bandwidth is limited, i.e., $\vec{E}_0(\omega)$ is zero at high frequencies. Hence, in practice, the filter above may be tapered appropriately at high frequency, so that high-frequency noise is not unduly amplified.

CONCLUSIONS

Finally, although the instant invention has been described herein as operating on EM traces that are maintained in natural time (in contrast to the methods of the prior art that employ an initial transformation to log-time followed by the application of a natural-time seismic algorithm), those of ordinary skill in the ad will recognize that most seismic time-distance processes can be rewritten to function in other (e.g., log-time) domains. As such, for purposes of the instant invention "natural time" will be additionally construed to include instances where the EM data have been transformed to another time or offset dimension and a time-distance seismic algorithm that typically would have operated on natural time data has been correspondingly recoded to operate on the transformed EM data.

Further, those of ordinary skill in the art will recognize that, although the methods discussed herein in connection with Q deconvolution are best understood conceptually via their expression in the frequency domain, there is an equivalent time-domain algorithm that would accomplish the same result. That is, theoretical interchangeability between algorithms that operate in the frequency domain and the time domain is well known. As a consequence, when the instant invention is said to operate on one or more frequencies, that language should be broadly interpreted to include cases where the algorithm operates in the frequency domain, as well as instances where a substantially equivalent operation is performed in the time domain.

While the invention has been described and illustrated herein by reference to a limited number of embodiments in relation to the drawings attached hereto, various changes and further modifications, apart from those shown or suggested herein, may be made therein by those skilled in the art, without exceeding the scope of what has been invented, the scope of which is to be determined only by reference to the following claims.

What is claimed is:

1. A method of collecting and processing EM data for use in geophysical exploration within a predetermined volume of the earth containing structural and stratigraphic features conducive to the generation, migration, accumulation, or presence of hydrocarbons, comprising the steps of:
    (a) collecting an EM survey that images at least a portion of said predetermined volume of the earth, said survey comprising a plurality of EM traces;
    (b) selecting at least one of said EM traces, each of said selected EM traces having a source-receiver distance associated therewith, and each of said selected EM traces having a plurality of EM samples organized in natural time associated therewith;
    (c) selecting at least one time-distance processing algorithm;
    (d) applying said at least one time-distance processing algorithm to said selected EM traces and said samples associated therewith using said at least one time-distance processing algorithm at least according to said associated source-receiver distances and said selected EM trace samples, thereby producing a plurality of processed EM traces; and, (e) writing at least a portion of said processed EM traces to computer storage.

2. The method according to claim 1, wherein said at least one time-distance processing algorithm is selected from a group consisting of velocity filtering, muting in a window, f-k filtering, NMO, DMO, time migration, depth migration, velocity estimation, tomography, and, tau-p filtering.

3. The method according to claim 1, wherein step (d) comprises the steps of:

(d1) selecting a plurality of different frequencies, (d2) selecting a value of a parameter Q, wherein said parameter Q is a quality factor related to a transmission of EM data, (d3) correcting each of said at least one selected EM traces for at least one of attenuation and dispersion at each of said selected plurality of frequencies according to said parameter Q, thereby producing a corresponding plurality of corrected EM traces, each of said corrected EM traces having a plurality of corrected samples associated therewith, and, (d4) processing said corrected EM traces and said associated corrected samples using said at least one time-distance processing algorithm at least according to said associated source-receiver distances, thereby producing a plurality of processed EM traces.

4. The method according to claim 3, wherein said parameter Q is approximately equal to ½.

5. The method according to claim 1, wherein said computer storage is selected from a group consisting of a magnetic disk, a magnetic tape, an optical disk, a magneto-optical disk, RAM, and non-volatile RAM.

6. The method according to claim 1, further comprising the step of:

(h) viewing at least a portion of said processed EM traces on a display device.

7. A non-transitory computer readable medium adapted for use by a digital computer, said non-transitory computer readable medium containing computer instructions defining the method of claim 1, said non-transitory computer readable medium being readable by a digital computer, said computer instructions programming said digital computer to perform said method, and, said non-transitory computer readable medium being selected from the group consisting of computer RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

8. The method according to claim 1, wherein said EM data traces are selected from a group consisting of CSEM data traces, f-CSEM data traces, and t-CSEM data traces.

9. A method of geophysical exploration within a predetermined volume of the earth, wherein is provided an EM survey that images at least a portion of the predetermined volume of the earth, said EM survey containing at least two EM traces therein, comprising the steps of:

(a) selecting at least one of said EM traces;

(b) selecting a plurality of frequencies;

(c) correcting each of said at least one selected EM traces for attenuation and/or dispersion at each of said selected plurality of frequencies, thereby producing a plurality of processed EM traces;

(d) processing said EM traces with at least one seismic imaging algorithm, thereby producing a plurality of seismic processed EM traces; and, (e) writing at least a portion of said seismic processed EM traces to computer storage.

10. The method according to claim 9, wherein step (d) comprises the step of:

(d1) processing said EM traces with at least one seismic imaging algorithm, wherein said at least one of said at least one seismic imaging algorithms is a time-distance algorithm, thereby producing a plurality of seismic processed EM traces.

11. The method according to claim 10, wherein said time-distance processing algorithm is selected from a group consisting of muting, NMO, DMO, time migration, depth migration, tau-p filtering, velocity estimation, tomography, and f-k filtering.

12. The method according to claim 11, wherein step (c) comprises the steps of:

(c1) selecting a reference frequency c, (c2) for each of said selected EM traces, (i) selecting one of said plurality of frequencies, wherein said selected frequency is represented by $\omega_0$, (ii) correcting said selected EM trace for attenuation and dispersion according to the following formula:

$$\exp[+\omega R_0/2QV_{phs}+i\omega(R_0/V_{phs}-R_0/V_0)],$$

where, $R_0$ is a length of a travel path from said selected EM trace to an EM source giving rise to said selected EM trace, where $$V_0 \equiv V_{phs}(\omega_0) = \sqrt{2\omega_0\rho/\mu},$$

where $$V_{phs} = \sqrt{\frac{2\omega\rho}{\mu}},$$

where $\rho$ is a subsurface resistivity, and, where $\mu$ is a subsurface magnetic permeability, and, (iii) performing steps (i) and (ii) above for each of said selected plurality of frequencies, and, (e3) performing at least step (e2) for each of said selected EM traces, thereby producing a plurality of processed EM traces.

13. The method according to claim 11, wherein said computer storage is selected from a group consisting of a magnetic disk, a magnetic tape, an optical disk, a magneto-optical disk, RAM, and non-volatile RAM.

14. The method according to claim 11, further comprising the step of:

(g) viewing at least a portion of said processed EM traces on a display device.

15. A non-transitory computer readable medium adapted for use by a digital computer, said non-transitory computer readable medium containing computer instructions defining the method of claim 11, said non-transitory computer readable medium being readable by said digital computer, said computer instructions programming said digital computer to perform said method, and, said non-transitory computer readable medium being selected from the group consisting of computer RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

16. The method according to claim 11, wherein said EM data traces are selected from a group consisting of CSEM data traces, f-CSEM data traces, and t-CSEM data traces.

17. The method according to claim 10, wherein step (c) comprises the steps of:
(c1) selecting a value of a parameter Q, wherein said parameter Q is a quality factor related to a transmission of EM data, and,
(c2) correcting each of said at least one selected EM traces for attenuation at each of said selected frequencies according to said parameter Q, thereby producing a plurality of processed EM traces.

18. The method according to claim 17, wherein said parameter Q is approximately equal to ½.

19. A method of geophysical exploration for hydrocarbons within a predetermined volume of the earth, wherein is provided an EM survey that images at least a portion of the predetermined volume of the earth, said EM survey containing at least two EM traces therein, comprising the steps of:
(a) selecting at least one of said EM traces;
(b) selecting a plurality of frequencies;
(c) selecting a reference frequency, $\omega_0$,
(d) choosing one of said plurality of selected frequencies, wherein said chosen frequency is represented by $\omega$,
(e) correcting said selected EM trace for attenuation and dispersion according to $$\exp[+\omega R_0/V_{phs}+i\omega(R_0/V_{phs}-R_0/V_0)],$$

where, $R_0$ is a length of a travel path from said selected EM trace to an EM source giving rise to said selected EM trace, where $$V_0 \equiv V_{phs}(\omega_0) = \sqrt{2\omega_0\rho/\mu},$$

where $$V_{phs} = \sqrt{\frac{2\omega\rho}{\mu}},$$

where $\rho$ is a subsurface resistivity, and,
where $\mu$ is a subsurface magnetic permeability,
(f) performing steps (d) and (e) above for each of said selected plurality of frequencies, thereby creating a processed EM trace; and,
(g) using said processed EM trace to explore for hydrocarbons within the predetermined volume of the earth.
(h) processing said EM traces with at least one seismic imaging algorithm, thereby producing a plurality of seismic processed EM traces; and,
(i) writing at least a portion of said seismic processed EM traces to computer storage.

20. The method according to claim 19, wherein said computer storage is selected from a group consisting of a magnetic disk, a magnetic tape, an optical disk, a magneto-optical disk, RAM, and non-volatile RAM.

21. The method according to claim 19, further comprising the step of:
(j) viewing at least a portion of said processed EM traces on a display device.

22. A non-transitory computer readable medium adapted for use by a digital computer, said non-transitory computer readable medium containing computer instructions defining the method of claim 19 are encoded,
said non-transitory computer readable medium being readable by said digital computer,
said computer instructions programming said digital computer to perform said method, and,
said non-transitory computer readable medium being selected from the group consisting of computer RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

23. The method according to claim 19, wherein said EM data traces are selected from a group consisting of CSEM data traces, f-CSEM data traces, and t-CSEM data traces.

24. A method of conducting an unaliased EM survey to acquire data suitable for use in geophysical exploration of a predetermined volume of the earth containing structural and stratigraphic features conducive to the generation, migration, accumulation, or presence of hydrocarbons, comprising the steps of:
(a) selecting a subsurface target within said predetermined volume of the earth;
(b) determining at least one EM velocity proximate to said subsurface target, said at least one EM velocity being representative of a velocity of an EM wave propagation proximate to said subsurface target;
(c) determining an approximate dip of said subsurface target;
(d) using at least said at least one EM velocity and said approximate dip of said subsurface target to determine at least one of an EM source-receiver near offset in said EM survey, an EM source-receiver far offset in said EM survey, a number of EM traces in said EM survey, an EM trace spacing in said EM survey and a discrete sampling interval in natural time, thereby designing an unaliased EM survey;
(e) collecting EM data traces according to said designed EM survey; and,
(f) using said EM data traces for the exploration, appraisal, development, or surveillance of hydrocarbons within said predetermined volume of the earth.

25. The method according to claim 24, wherein said EM data traces are selected from a group consisting of CSEM data traces, f-CSEM data traces, and t-CSEM data traces.

26. The method according to claim 24, further comprising the step of:
(g) writing at least a portion of said processed EM data traces to computer storage.

27. The method according to claim 26, wherein said computer storage is selected from a group consisting of a magnetic disk, a magnetic tape, an optical disk, a magneto-optical disk, RAM, and non-volatile RAM.

28. A non-transitory computer readable medium adapted for use by a digital computer, said non-transitory computer readable medium containing computer instructions defining the method of claim 24 are encoded,
said non-transitory computer readable medium being readable by said digital computer,
said computer instructions programming said digital computer to perform said method, and,
said device being selected from the group consisting of computer RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

29. A method of geophysical exploration for hydrocarbons beneath the surface of the earth, comprising the steps of:
(a) selecting a subsurface target;
(b) situating at least one EM receiver proximate to said subsurface target;
(c) positioning an EM source within sensing ranging of at least one of said at least one EM receivers;
(d) activating said EM source according to a predetermined pattern, wherein said predetermined pattern is selected from a group consisting of a pseudo-random series of short binary pulses and a frequency sweep over a predetermined frequency range;
(e) sensing said activated EM source via said at least one of said EM receivers, thereby obtaining at least one EM trace;
(f) processing said at least one EM traces according to said predetermined pattern, thereby acquiring CSEM data suitable for use in geophysical exploration beneath the surface the earth.

30. The method of geophysical exploration for hydrocarbons within a predetermined volume of the earth according to claim 29, wherein step (f) comprises the steps of:
(f1) obtaining a pilot signal representative of said predetermined pattern, and,
(f2) cross correlating said pilot trace with said at least one of said EM traces, thereby acquiring CSEM data suitable for use in geophysical exploration within said predetermined volume of the earth.

31. The method of geophysical exploration for hydrocarbons within a predetermined volume of the earth according to claim 29, wherein said pilot signal representative of said predetermined pattern is obtained from a near-field receiver situated proximate to said EM source, said near-field receiver at least for sensing said activated EM source.

32. The method of geophysical exploration for hydrocarbons within a predetermined volume of the earth according to claim 29, wherein further comprising the step of:

(g) writing at least a portion of said processed EM data traces to computer storage.

33. The method according to claim 29, wherein said at least one EM trace is selected from a group consisting of a CSEM trace, an f-CSEM trace, and a t-CSEM trace.

34. A non-transitory computer readable medium adapted for use by a digital computer, said non-transitory computer readable medium being readable by the digital computer, said non-transitory computer readable medium containing a plurality of computer instructions for providing an EM survey that covers at least a portion of a predetermined volume of the earth, said EM survey comprising a plurality of EM traces,
said plurality of computer instructions causing the digital computer to perform the steps of:
(a) selecting at least one of said EM traces;
(b) selecting a plurality of different frequencies;
(c) selecting a value of a parameter Q, wherein said parameter Q is a quality factor related to a transmission of EM data;
(d) correcting each of said at least one selected EM traces for at least one of attenuation and dispersion at each of said selected plurality of frequencies according to said parameter Q, thereby producing a plurality of processed EM traces; and,
(e) writing at least a portion of said processed EM traces to computer storage.

35. The non-transitory computer readable medium according to claim 34, wherein
said non-transitory computer readable medium is selected from the group consisting of computer RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

* * * * *